(12) United States Patent
Bricaud

(10) Patent No.: US 6,454,607 B2
(45) Date of Patent: Sep. 24, 2002

(54) SMART CARD CONNECTOR WITH IMPROVED CONTACTS

(75) Inventor: Hervé G. Bricaud, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/864,799

(22) Filed: May 23, 2001

(30) Foreign Application Priority Data

Jun. 5, 2000 (FR) .............................................. 00 07139

(51) Int. Cl.[7] .............................................. H01R 24/00
(52) U.S. Cl. ........................ 439/630; 439/180; 439/862
(58) Field of Search .................................. 439/630, 632, 439/862, 180, 884, 81, 82, 84

(56) References Cited

U.S. PATENT DOCUMENTS 6,113,440 A * 9/2000 Fijten et al. ................. 439/862
6,129,588 A * 10/2000 Chang ......................... 439/630

FOREIGN PATENT DOCUMENTS

| EP | 0 570 039 A1 | 4/1993 |
| EP | 0 617 488 A1 | 3/1994 |
| EP | 0 656 597 A1 | 6/1994 |
| EP | 0 926 769 A1 | 12/1998 |
| EP | 0 969 408 A2 | 6/1999 |

* cited by examiner

*Primary Examiner*—P. Austin Bradley
*Assistant Examiner*—Truc Nguyen
(74) *Attorney, Agent, or Firm*—Roger C. Turner

(57) ABSTRACT

An electrical connector (12B) for connecting to contact pads on a face of a smart card, where the contact projecting portions (30B) are shaped to be depressed even when a side edge (100) of a smart card (C) is inserted laterally (L) into place. The upwardly-projecting portion of each contact has a first lateral side (80B) that extends at an incline angle (A) of less than 70°, and preferably less than 60°, from the horizontal, along more than half the width of the contact projecting portion.

14 Claims, 28 Drawing Sheets

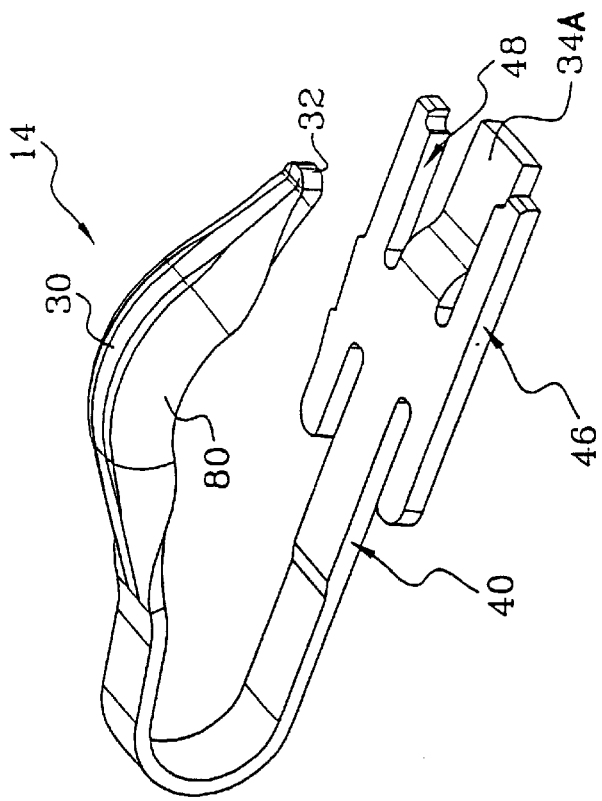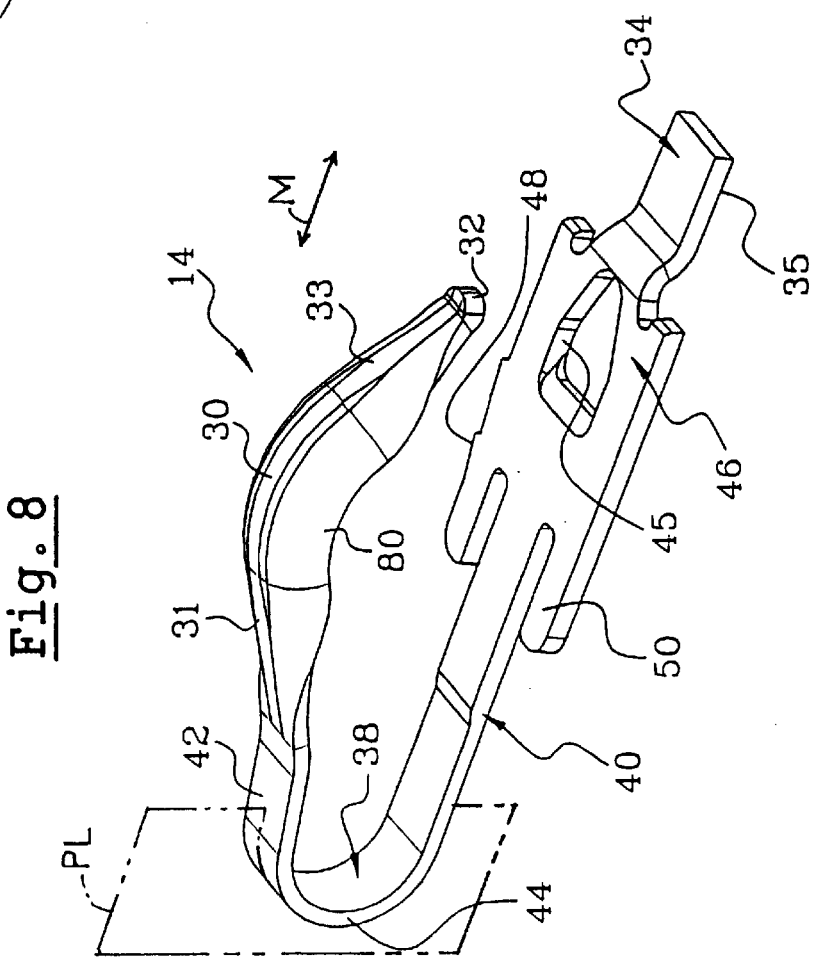

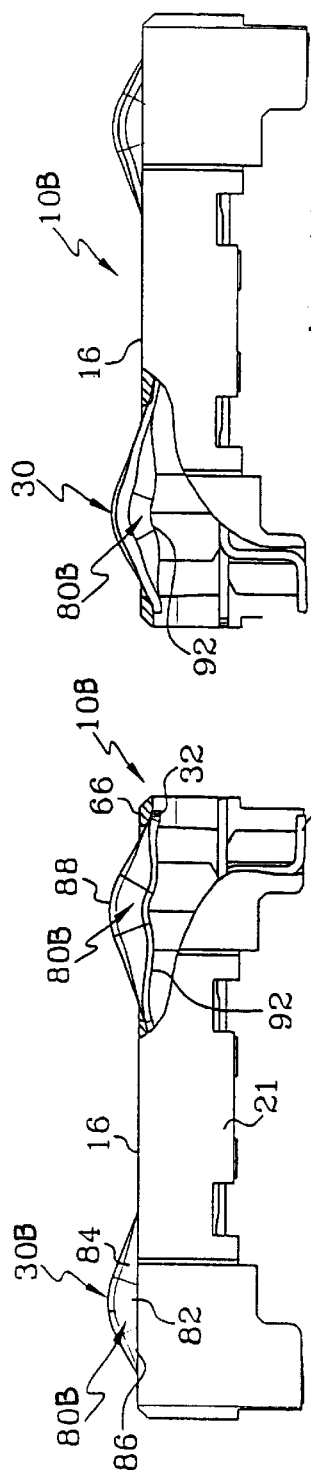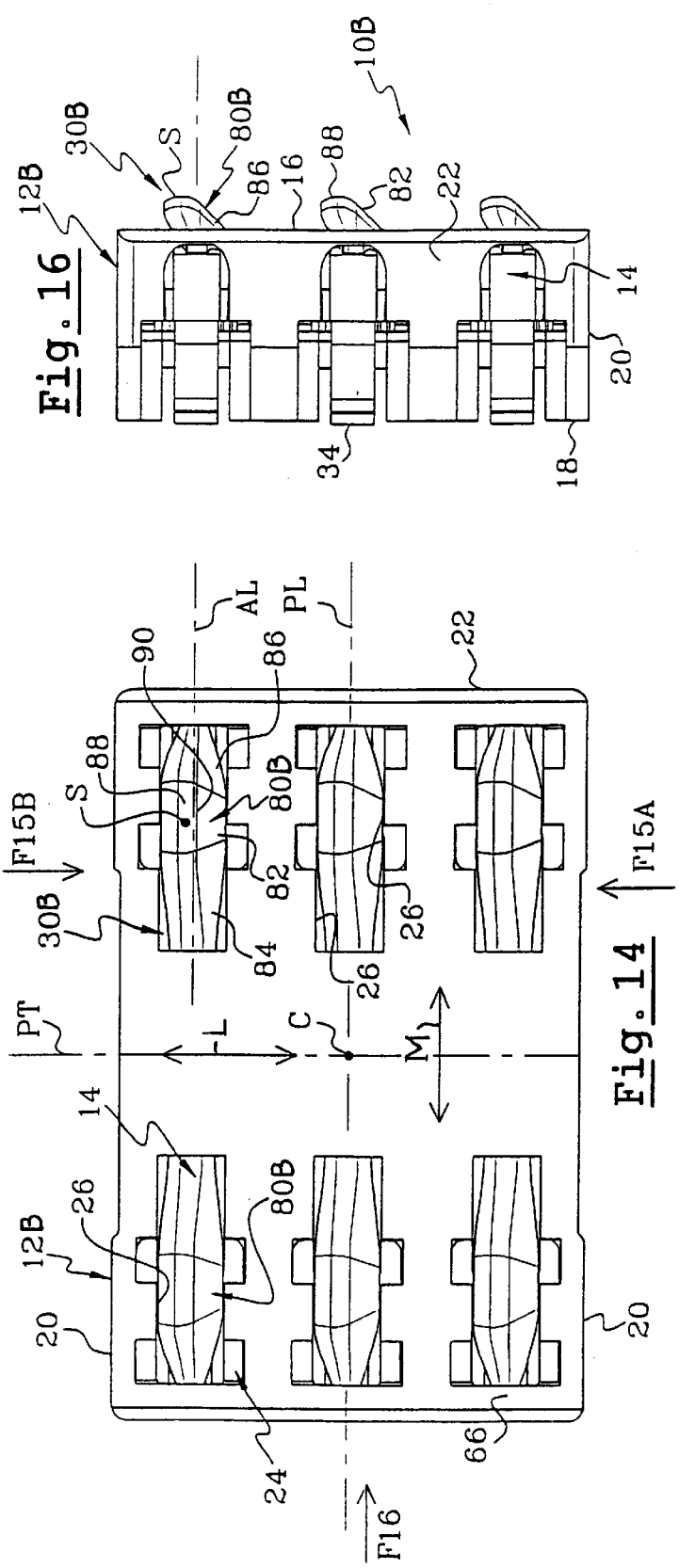

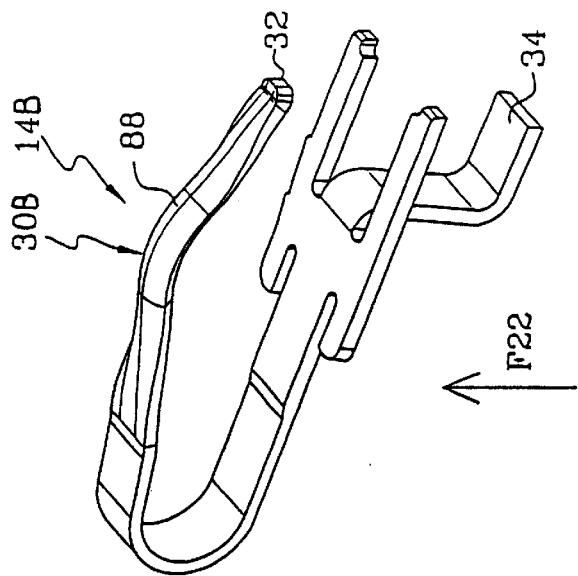
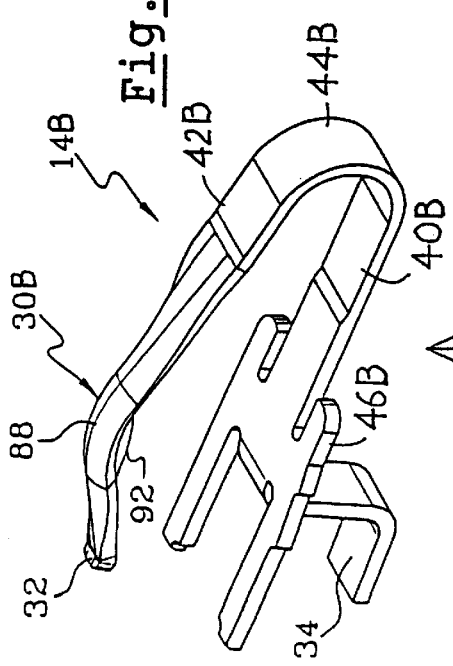
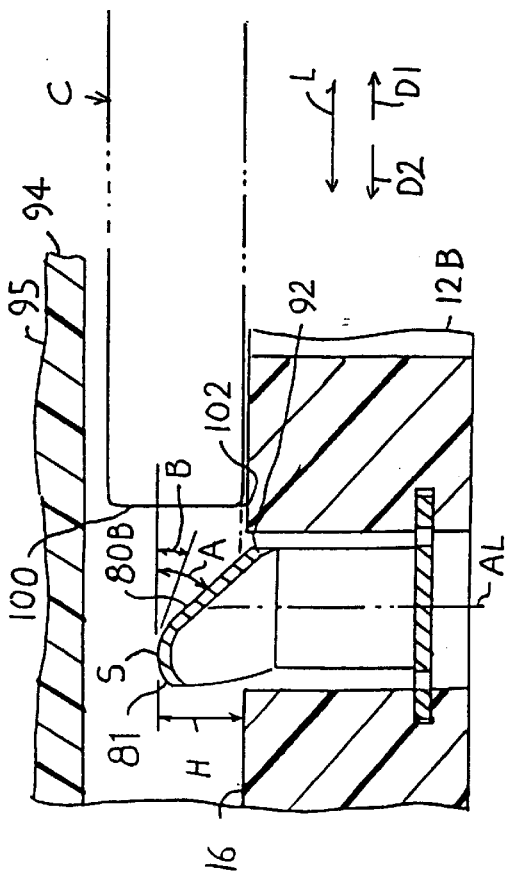

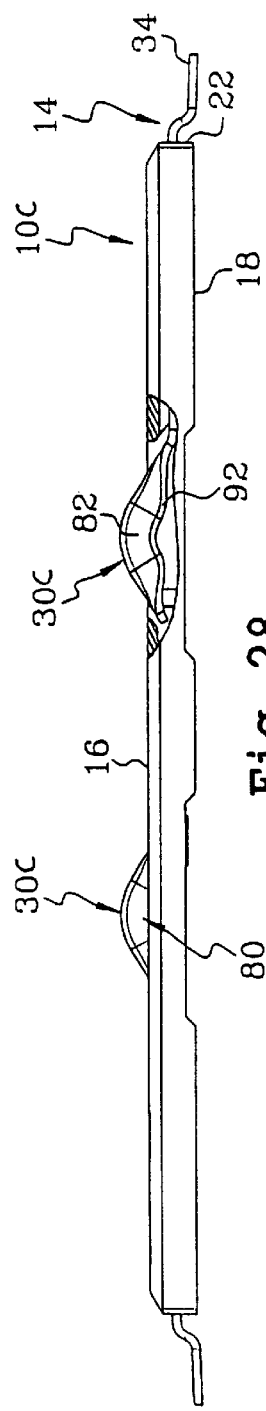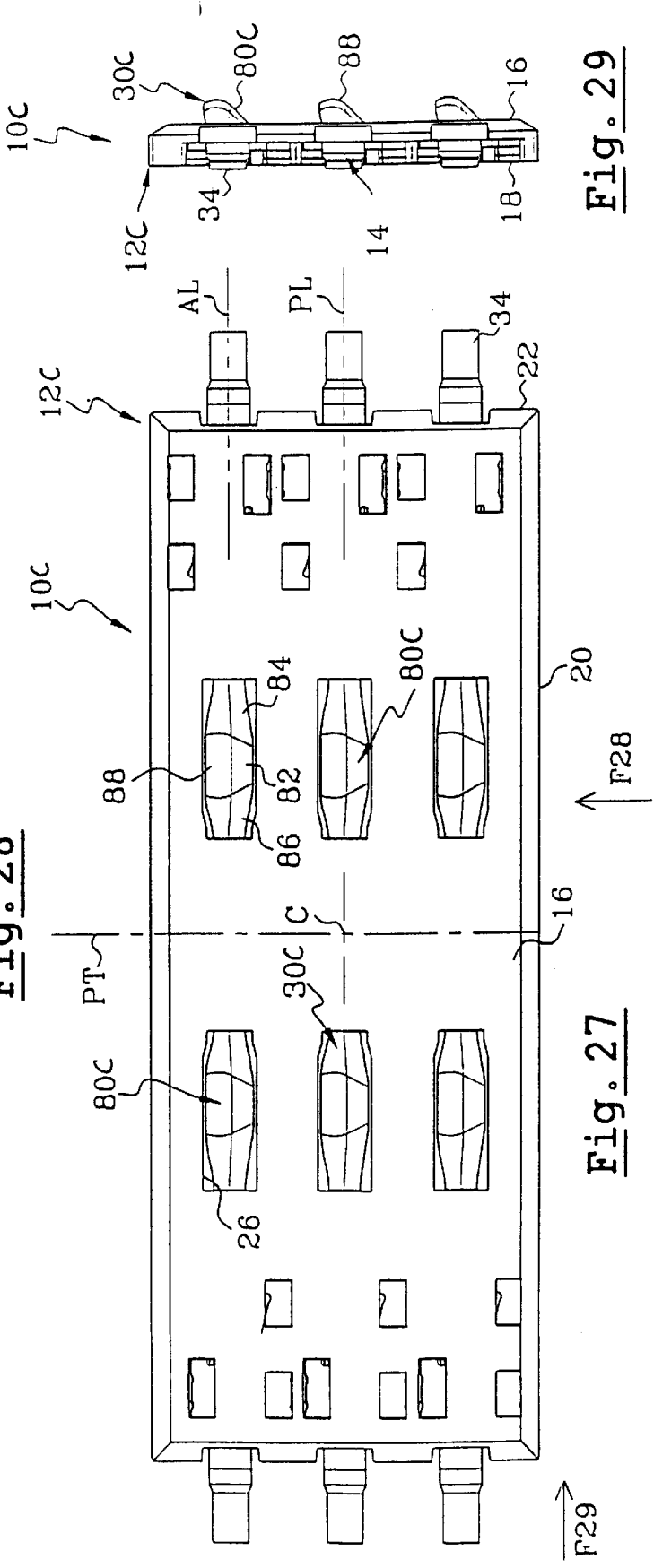

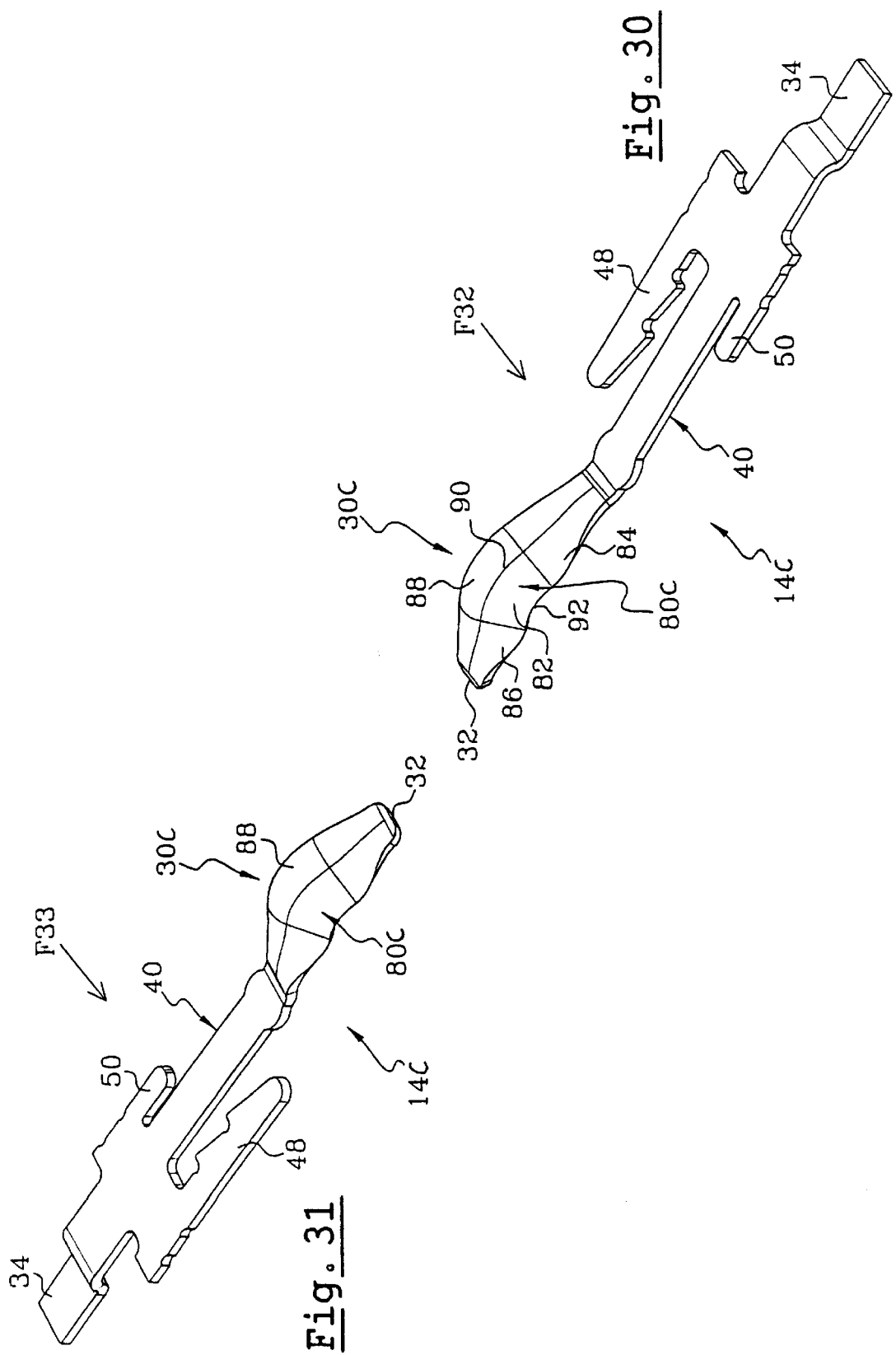

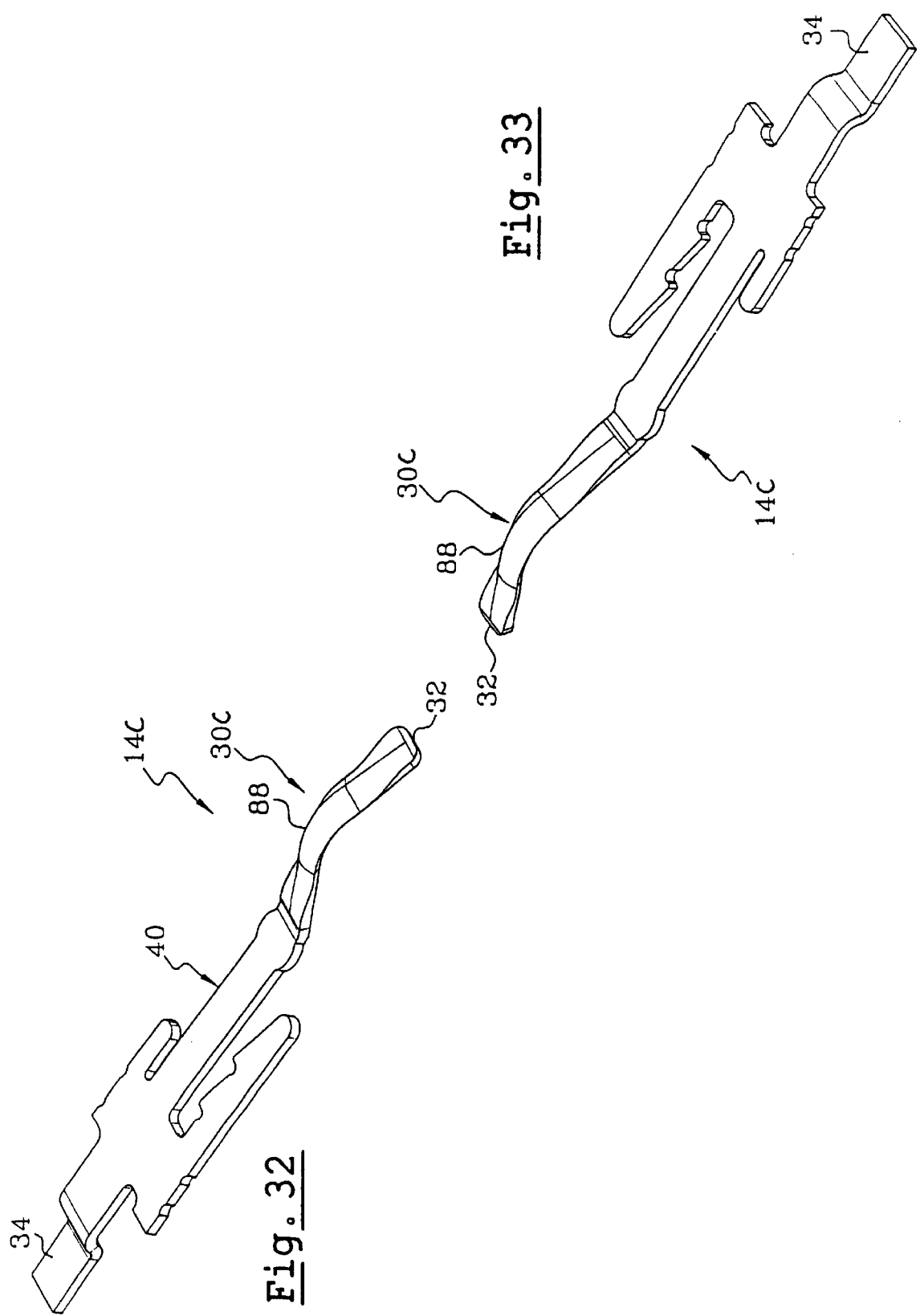

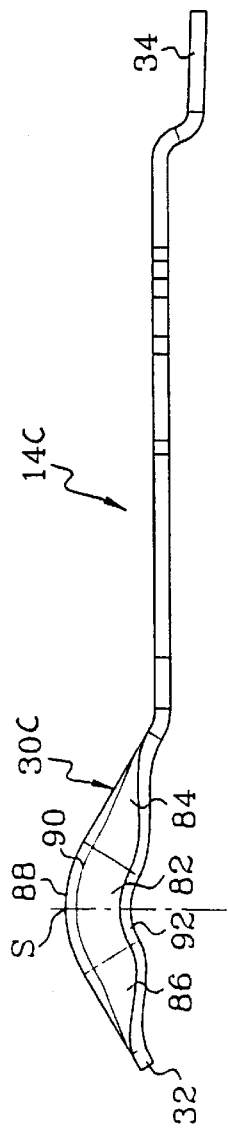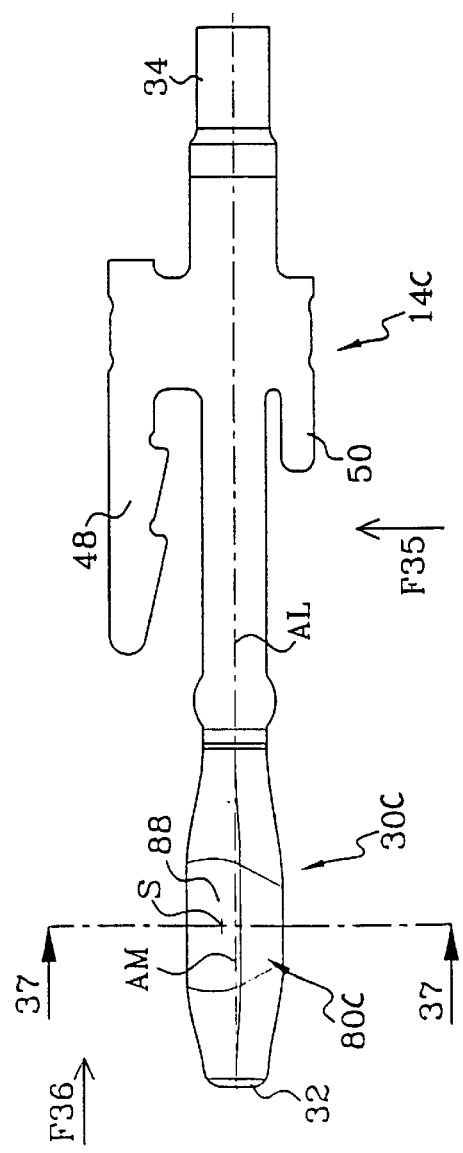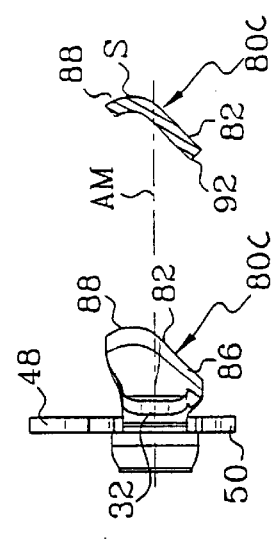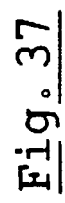

SMART CARD CONNECTOR WITH IMPROVED CONTACTS

CROSS-REFERENCE TO RELATED APPLICATION

Applicant claims priority from French application 0007139 filed Jun. 5, 2000.

BACKGROUND OF THE INVENTION

Smart cards, which are all of about the same thickness as a credit card and of about the same or smaller width and length, have contact pads on one face. A smart card reader includes a connector with an upper face and with contacts having projecting portions that project above the upper face. A cover holds down a smart card close to the upper face, so the projecting portions of the contacts engage the contact pads of the card.

The smart card has a longitudinal (front-to-rear) length longer than its lateral width. In prior connectors the card is intended to be inserted with its longitudinal front edge being the leading edge that depresses the curved projecting portions of the contacts. A connector of simple design and small size, which enabled more versatile insertion of the card, would be of value.

It is noted that connectors with depressable contacts are described in U.S. patent application Ser. No. 09/741,640 filed Dec. 19, 2000, and owned by the assignee of the present application.

SUMMARY OF THE INVENTION

In accordance with one embodiment of the present invention, an electrical connector is provided for connecting to contact pads on a face of a smart card, which enables lateral sideward movement of a smart card into the connector. The connector includes a body with contacts arranged in a plurality of rows and columns, with each row extending laterally and each column extending longitudinally, with two contacts in each column. The contacts, which are formed of sheet metal, each has an upper section with a projecting portion that is bent into a long loop that is curved about lateral axes. As a result, if a front edge of a card in inserted to slide closely over the upper edge of the connector body, then the front face will easily depress the contacts. Applicant constructs the contacts so a card can be inserted laterally wherein its side edge moves laterally across the contacts while reliably depressing them, as well as the card being inserted longitudinally.

Each contact is formed of a strip of sheet metal and lies on a vertical centerplane that bisects most of the strip. The projecting portion of each contact has a curved top part for engaging a card pad, and has a lateral first side that extends at an incline so it extends downwardly and away from the centerplane, down to at least about the upper surface of the connector body. The incline angle is less than 70° and preferably less than 60° from the horizontal, so a card that slides in a second lateral direction over the body upper face, will reliably depress the contacts.

Each projecting portion is preferably nonsymmetric about the centerplane. The nonsymmetry results in a second side of the contact projecting portion, having a smaller lateral width than the first side, and with the top that engages the card being offset from the centerplane and lying on the second side of the centerplane. This results in a greater lateral width of the first side so it can extend at a smaller angle to the horizontal for a given available width for the contact.

The novel features of the invention are set forth with particularity in the appended claims. The invention will be best understood from the following description when read in conjunction with the accompanying drawings.

BRIEF DESCRIPTION OF THE DRAWINGS

FIG. 8 is an isometric view of one of the contacts of the connector of FIG. 1.

FIG. 9 is an isometric view of another form of contact that can be used instead of the one in FIG. 8.

FIG. 14 is a top view of the connector of FIG. 10.

FIGS. 15A and 15B are side views, with partial cutaways, respectively taken along arrows F15A and F15B of FIG. 14.

FIG. 16 is an end view taken along arrow F16 of FIG. 14.

FIGS. 19 and 20 are isometric views taken along arrows F19 and F20 of FIGS. 17 and 18, and showing the opposite sides of the contacts.

FIG. 20A is a sectional view taken on line 20A—20A of FIG. 11.

FIG. 27 is plan view of the connector of FIG. 23.

FIG. 28 is a side elevation view of the connector of FIG. 23, with a portion being cut away.

FIG. 29 is an end view of the connector of FIG. 23.

FIG. 30 is a side isometric view of a contact of the connector of FIG. 23.

FIG. 31 is a side isometric view of another contact of the connector of FIG. 23, with the contacts of FIGS. 30 and 31 being a pair of longitudinally-spaced contacts.

FIGS. 32 and 33 are opposite side isometric views of the contacts of FIGS. 30 and 31.

FIG. 34 is a top view of the contact of FIG. 33.

FIG. 35 is a side elevation view taken on line F35 of FIG. 34.

FIG. 36 is an end view taken on line F36 of FIG. 34.

FIG. 37 is a sectional view taken on line 37—37 of FIG. 34.

DESCRIPTION OF THE PREFERRED EMBODIMENTS

Figure 1:
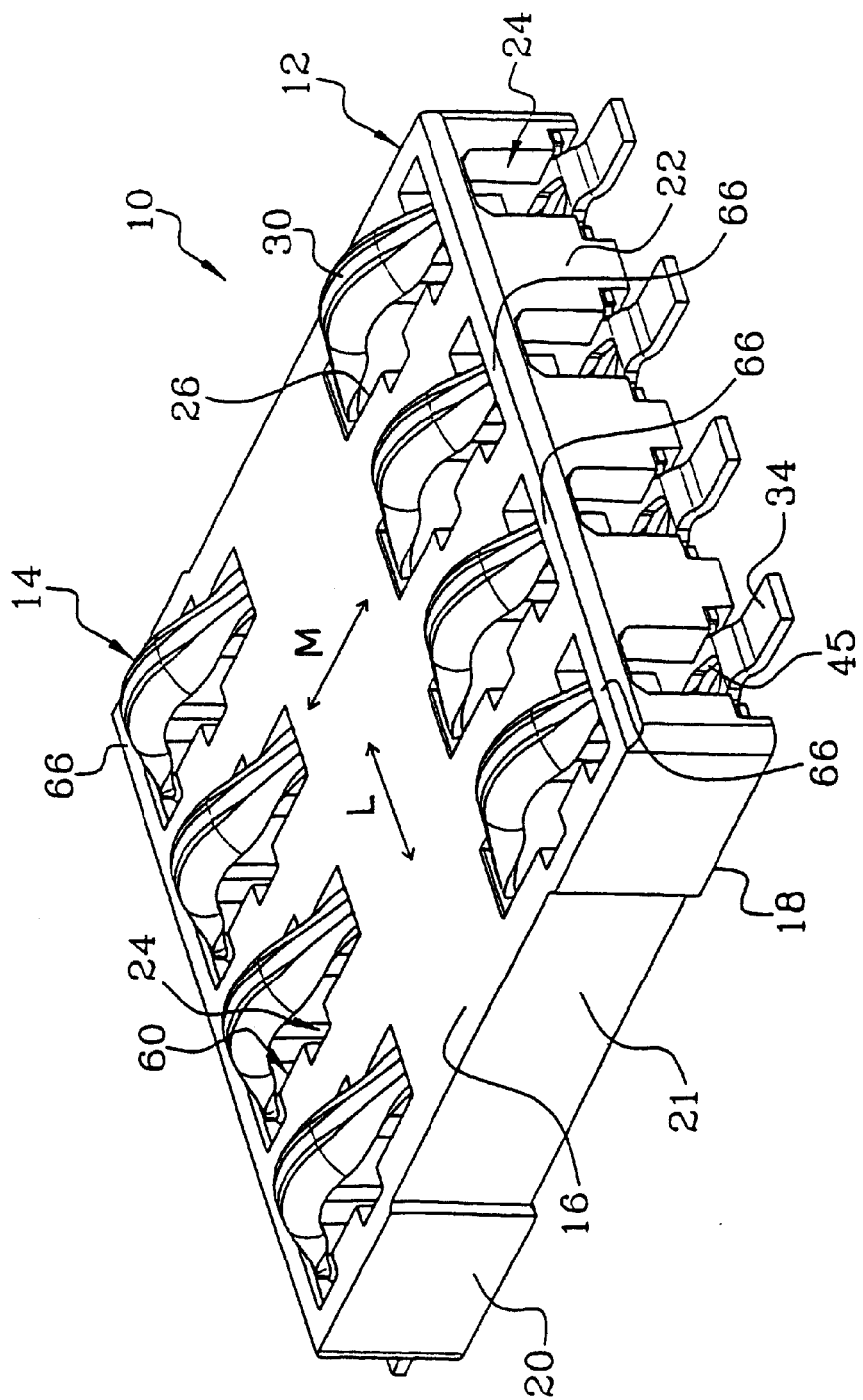
FIG. 1 is an isometric top view of a connector of the type described in earlier patent application Ser. No. 09/741,640 filed Dec. 19, 2000.

FIGS. 1–10 show a connector and contacts of the construction presented in earlier U.S. patent application Ser. No. 09/741,640 filed Dec. 19, 2000. The connector 10 includes a body 12 of insulating material which is molded, and a plurality of contacts 14 that are mounted in the body. The contacts are arranged in two rows that each extends in a lateral L direction, with each row in the illustrated connector including four contacts. Two contacts of the two rows that are substantially aligned in a longitudinal M direction form a pair. This arrangement mimics the contact pads of a smart card constructed in accordance with PCMCIA (Personal Computer Memory Card International Association), wherein the contact pads are arranged in two rows.

The body 12 is the general shape of a parallelepiped and has a horizontal upper face 16 and a horizontal lower face 18. The body has laterally spaced opposite sides 20 and longitudinal-spaced end faces 22. The body of FIG. 1 has eight cavities 24 that are each designed to hold one of the contacts. Each cavity opens vertically upward from the upper face 16 and vertically downward from the lower face 18.

Figure 4:
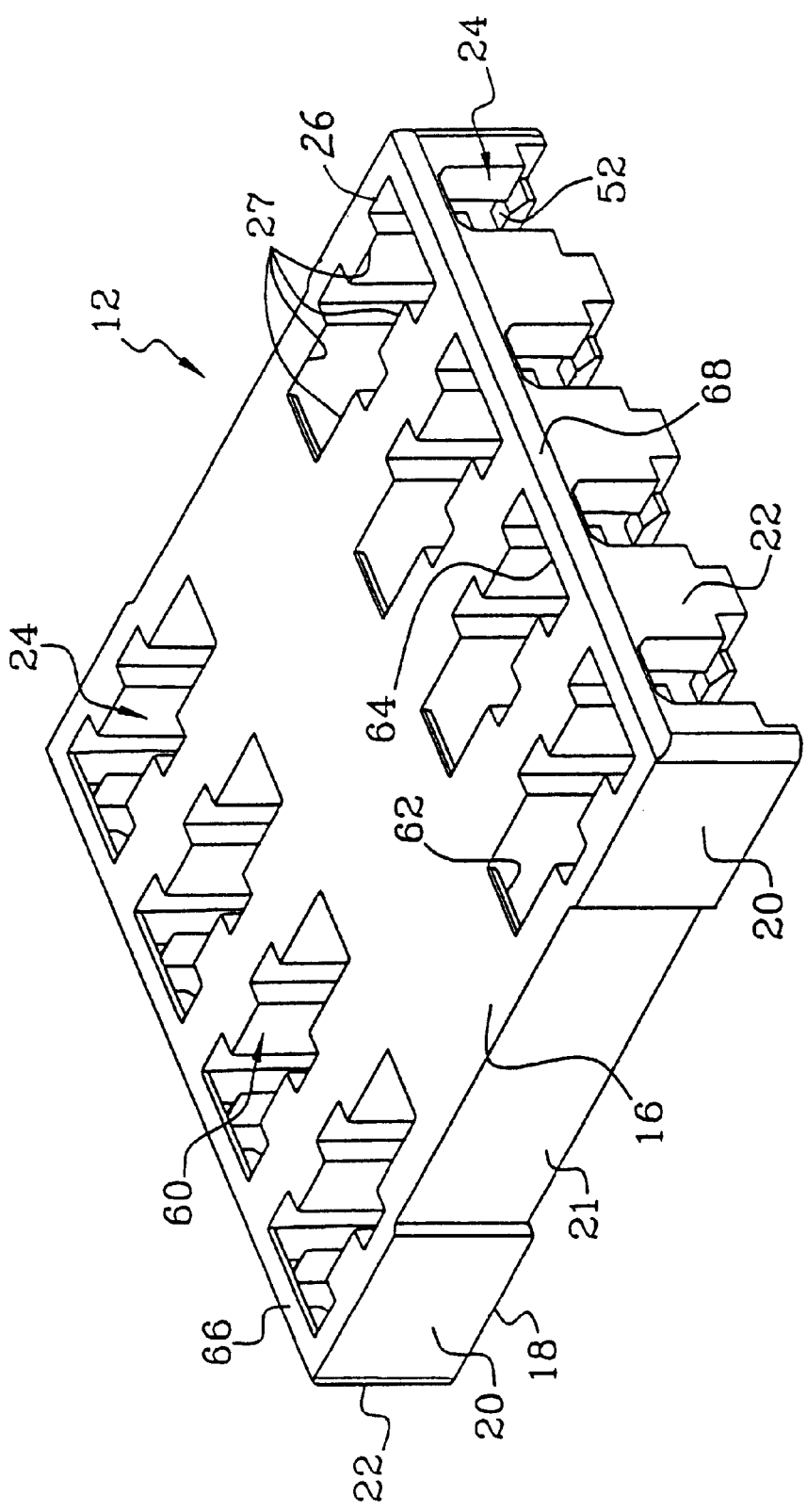
FIG. 4 is an isometric top view of the body of the connector of FIG. 1.
Figure 5:
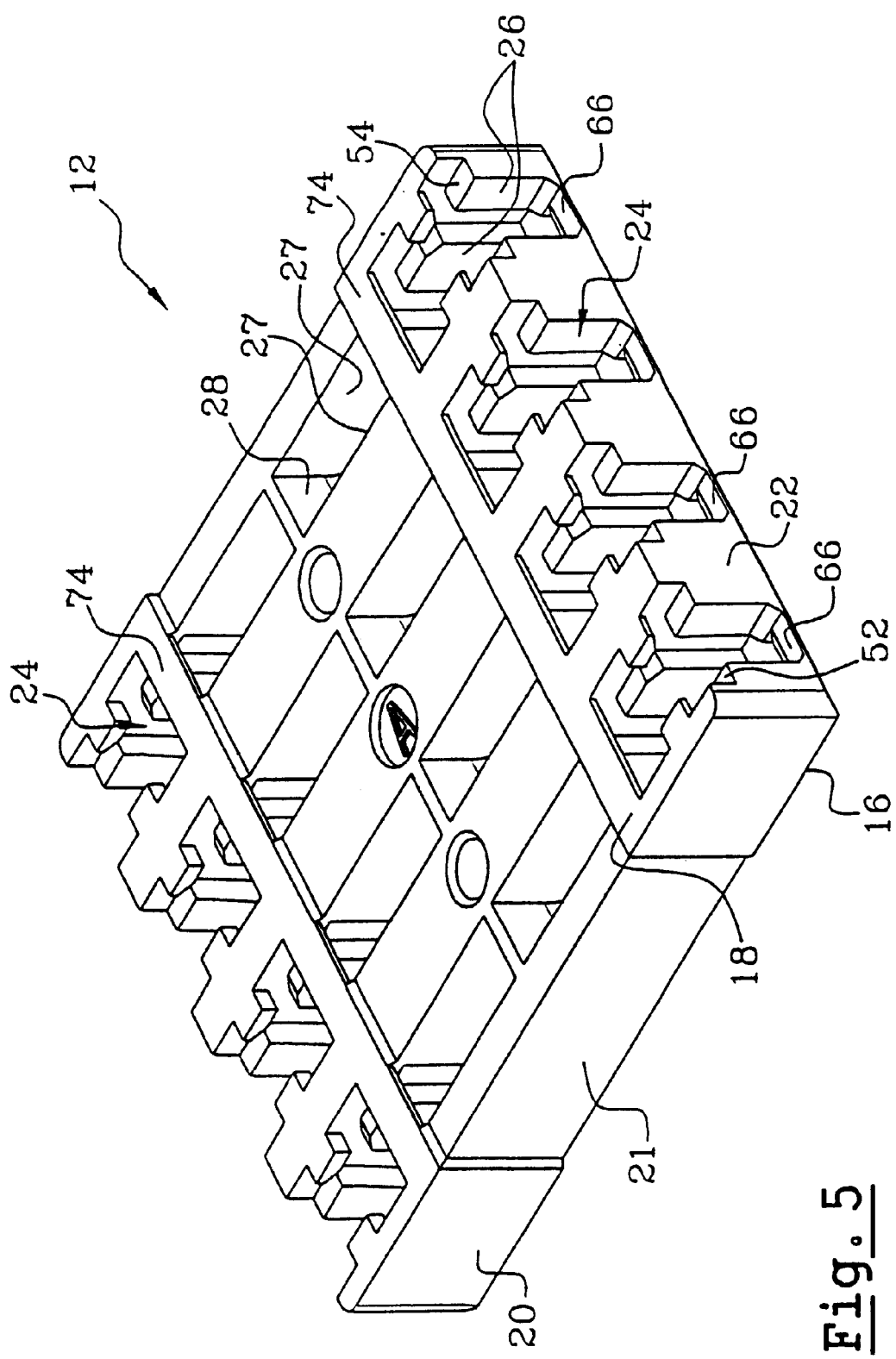
FIG. 5 is an isometric bottom view of the body of the connector of FIG. 1, with the body shown upside down.

As shown in FIG. 4, each cavity 24 has opposite sides 27 that extend up to the upper face 16 and that form an upper edge 26 of the cavity. FIG. 5 shows that a partition 28 forms the end of each cavity 24 which is closest to the other cavity of the pair. As shown in FIG. 8, each contact extends in the longitudinal direction M and has a vertical centerplane PL, with the contact of FIG. 8 being symmetric about its vertical centerplane.

Figure 6:
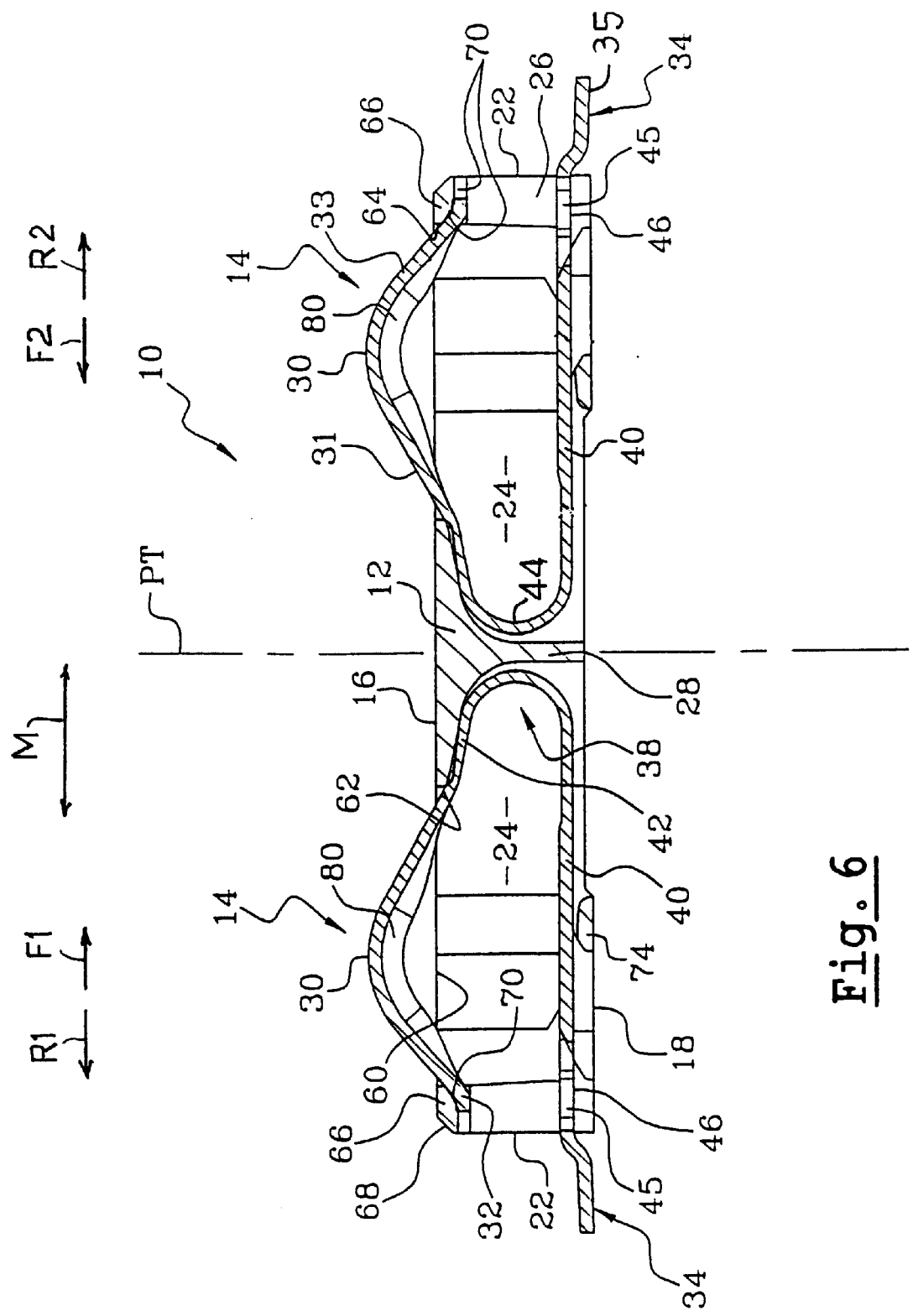
FIG. 6 is a sectional view taken on line 6—6 of FIG. 2.
Figure 7:
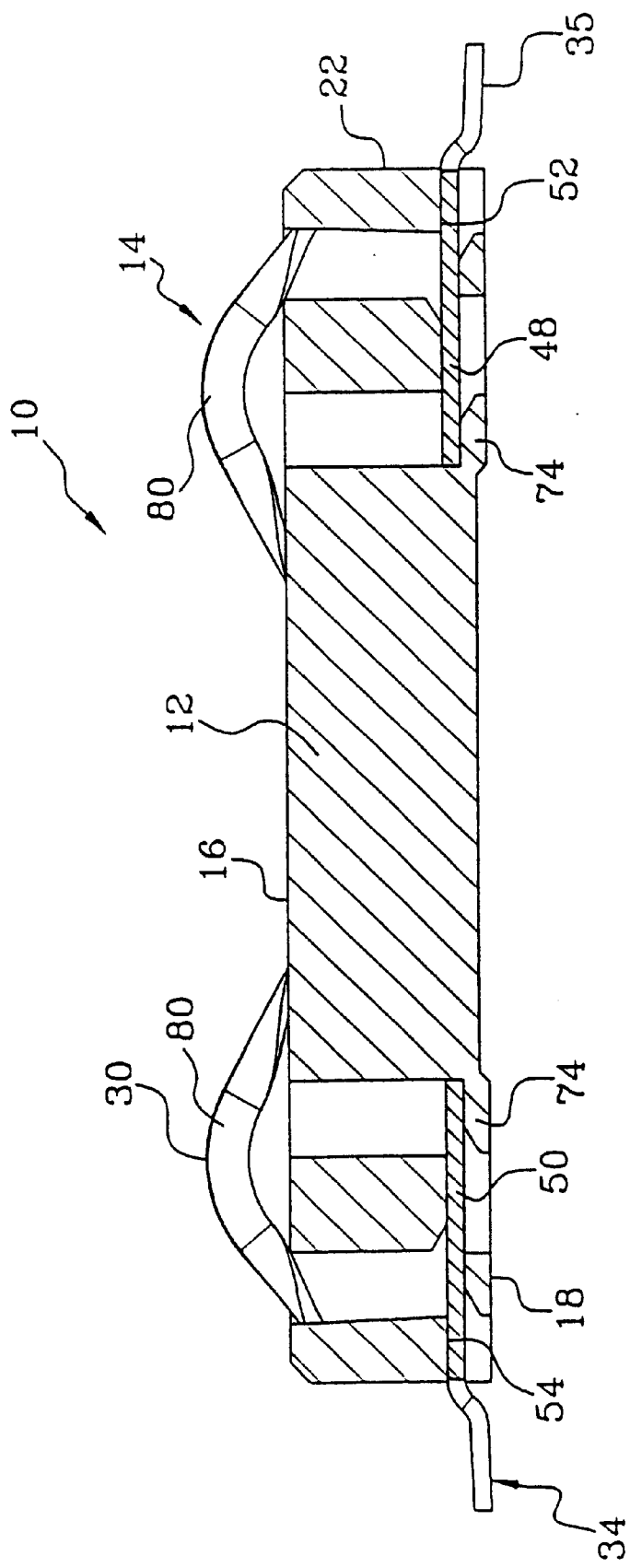
FIG. 7 is a sectional view taken on line 7—7 of FIG. 2.

FIG. 6 shows that each contact 14 has a projecting portion 30 that projects above the upper face 16 of the body when a smart card is not present. The projecting portion is in the form of a spoon, in that it is curved about both lateral and longitudinal axes of curvature.

Forward and rearward longitudinal directions F1, R1 are designated for one row of contacts, with forward and rearward longitudinal directions F2, R2 being designated for the other row. Each contact has an approximately horizontal nose 32 lying rearward of the projecting portion 30 to limit upward movement of the projecting portion 30 and thereby fix its height above the upper face 16. Each contact also has a termination end or tail 34 which extends rearwardly beyond the corresponding end face 22 of the body. The lower face of the tail lies in the plane of the lower face 18 of the body, and can be soldered to a conductive trace on a circuit board (not shown).

The contact includes a central linking part 38 with a lower branch 40 that extends longitudinally, an upward branch 42, and an approximately 180° loop or central bend 44. This forms the linking part as a U laid on its side, and forms an acute angle between the lower and upper branches 40, 42.

Each contact is formed of a strip of sheet metal having a width that is a plurality of times its thickness and with most of the length being of about the same width. The bend at 44 results in a contact of relatively short longitudinal length but with high resilience due to the bend. The length of the projecting portion 30 in the longitudinal direction M is a plurality of times the lateral width of the projecting portion. The top of the projecting portion projects above the body upper face 16 by about the width of the contact.

Figure 2:
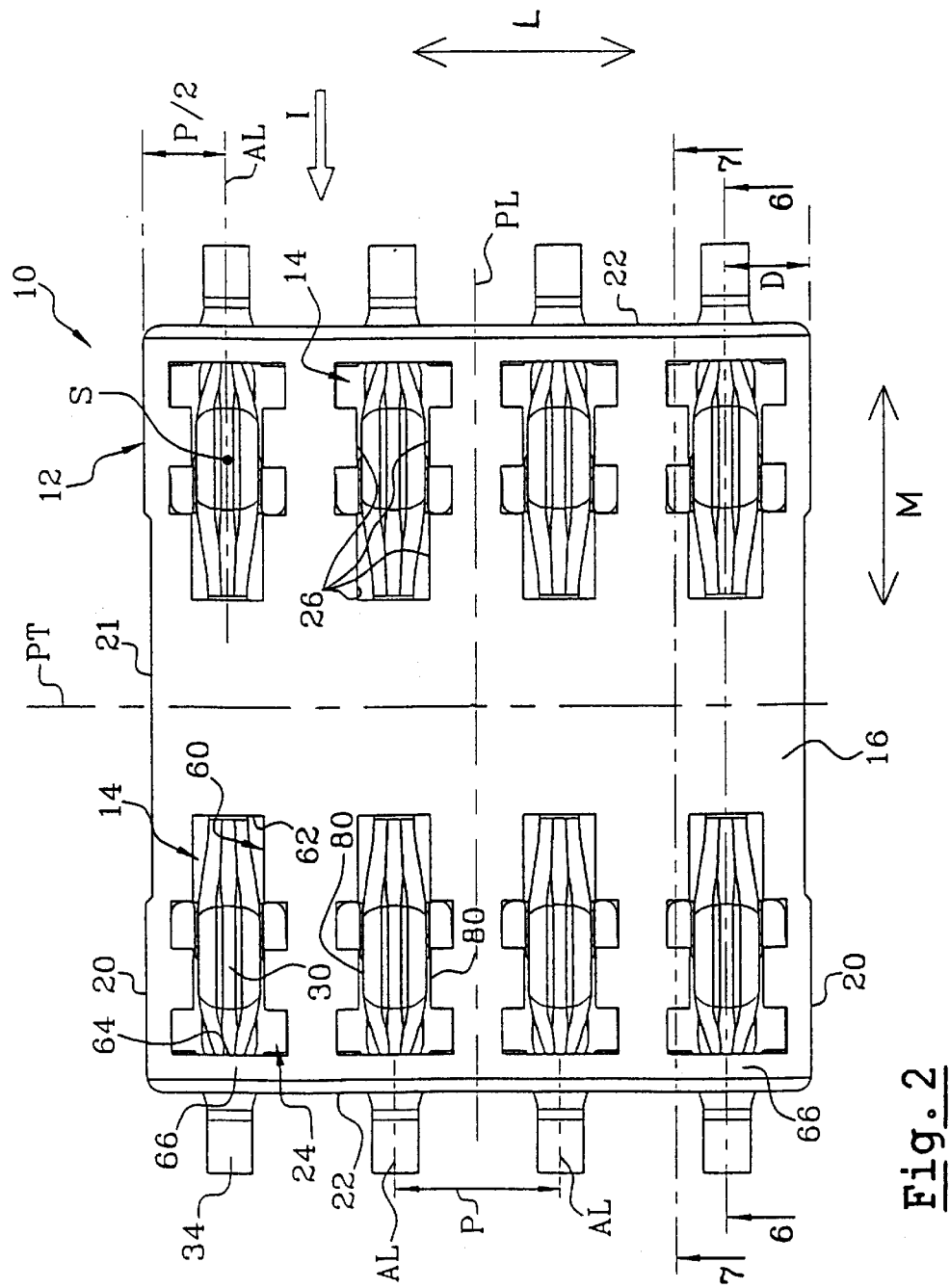
FIG. 2 is a top view of the connector of FIG. 1.
Figure 3:
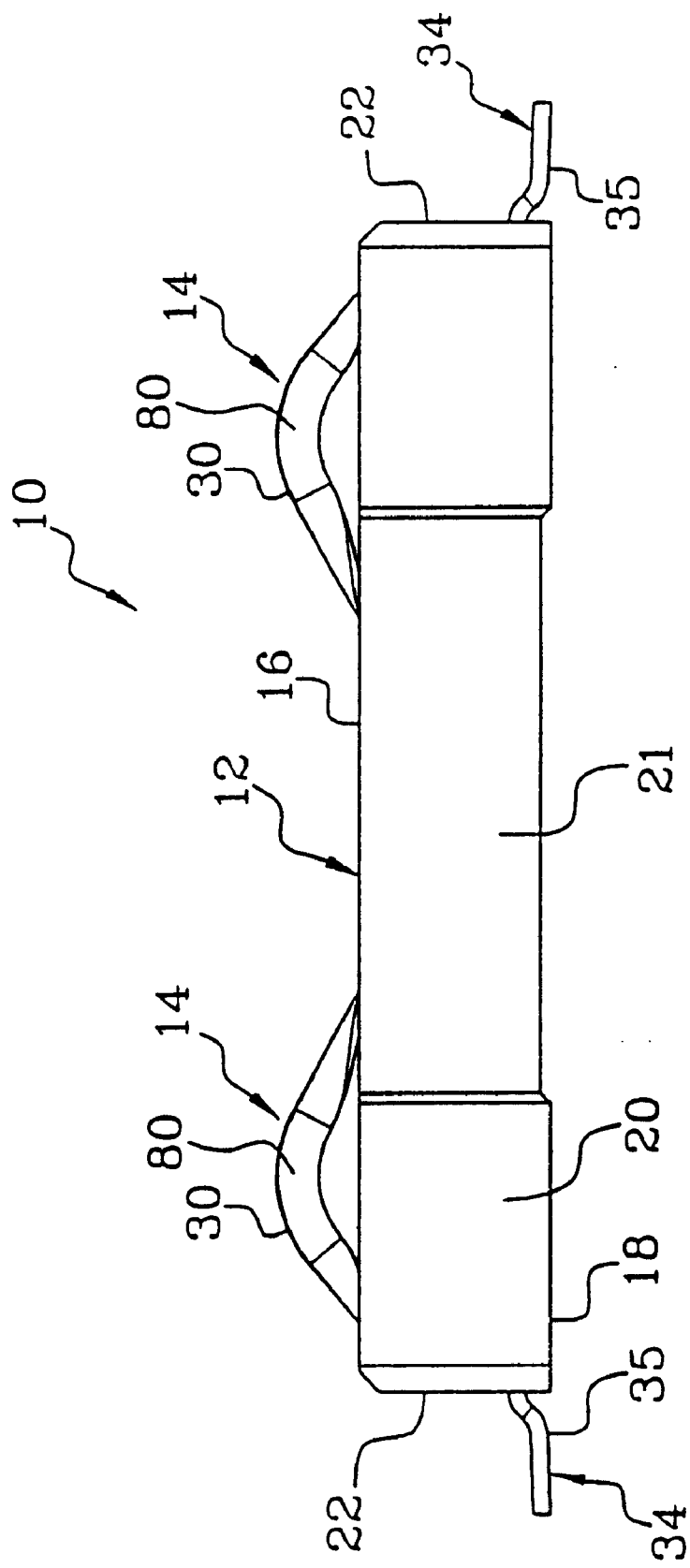
FIG. 3 is a left side view of the connector of FIG. 2.

FIG. 2 shows that the lateral distance D separating the vertical centerplane of a contact from the side face 20 is one-half the pitch P that separates adjacent contacts. This allows two connectors to be mounted side-by-side to form a connector with twice the number of contacts. It is noted that each side face 20 has a recess 21 where any flash, molding gates, or other irregularities lie.

FIG. 8 shows that each contact has a mounting portion 46 formed along the lower branch 40, with the mounting portion having a greater width than the rest of the lower branch. The mounting portion has a hole 45 that can receive a nose 32 when the projecting portion 30 is depressed. The mounting portion has a harpoon 48 on one lateral side of the middle and a stabilizing tab 50 on the other lateral side. The harpoon 48 and tab 50 slide into slots 52 (FIG. 5) and 54 in the body. FIG. 4 shows that each cavity has an open end extending into an end face 22, and forms a slot 60 opening to the upper face 16 for the projecting portion of the contact to project above the upper face of the body. Each slot has a front edge 62 furthest from the corresponding body end face and has another edge 64 at a crosspiece 66 of the body. As shown in FIG. 6, the crosspiece 66, which has a beveled edge 68, also forms a stop 70 that limits upward movement of the nose 32 of the contact. The contact is formed so the nose 32 presses from the against the stop 70 to slightly prestress the contact in its initial position before it is depressed by a smart card.

FIG. 9 shows another contact, where the termination tab or tail 34A is short. This construction allows the tails 34A to be located entirely inside the connector to reduce the longitudinal dimension of the connector.

The connector and contacts of FIGS. 1–9 permit a smart card to be slid in a longitudinal M direction across the contacts while depressing them, until the card is in its final position, where its contact pads are engaged by the contacts. FIG. 2 shows the longitudinal direction of sliding indicated by arrow I. Because of the fact that the projecting portion 30 of each contact has a considerable length in the longitudinal direction M, the front (or rear) edge of the inserted card can readily depress the projecting portions of the contacts, which extend at small angles to the horizontal so they are easily depressed. For example, in FIG. 6, the opposite ends of the projecting portions 30 of each contact extend at 30° to 40° from the horizontal, so they are readily depressed by the leading edge of a card that moves along the upper face 16 of the body. The contacts are not designed for a card insertion in a lateral L direction (FIG. 1). This is because the leading side edge of the card would encounter a side of the projecting portion of each contact which does not extend down to the level of the body upper face 16. Also, the bottom of the side of each contact, extends at a large angle to the horizontal so the contact is likely to be damaged by inelastic deformations in the lateral direction instead of being depressed by the card side edge.

Figure 10:
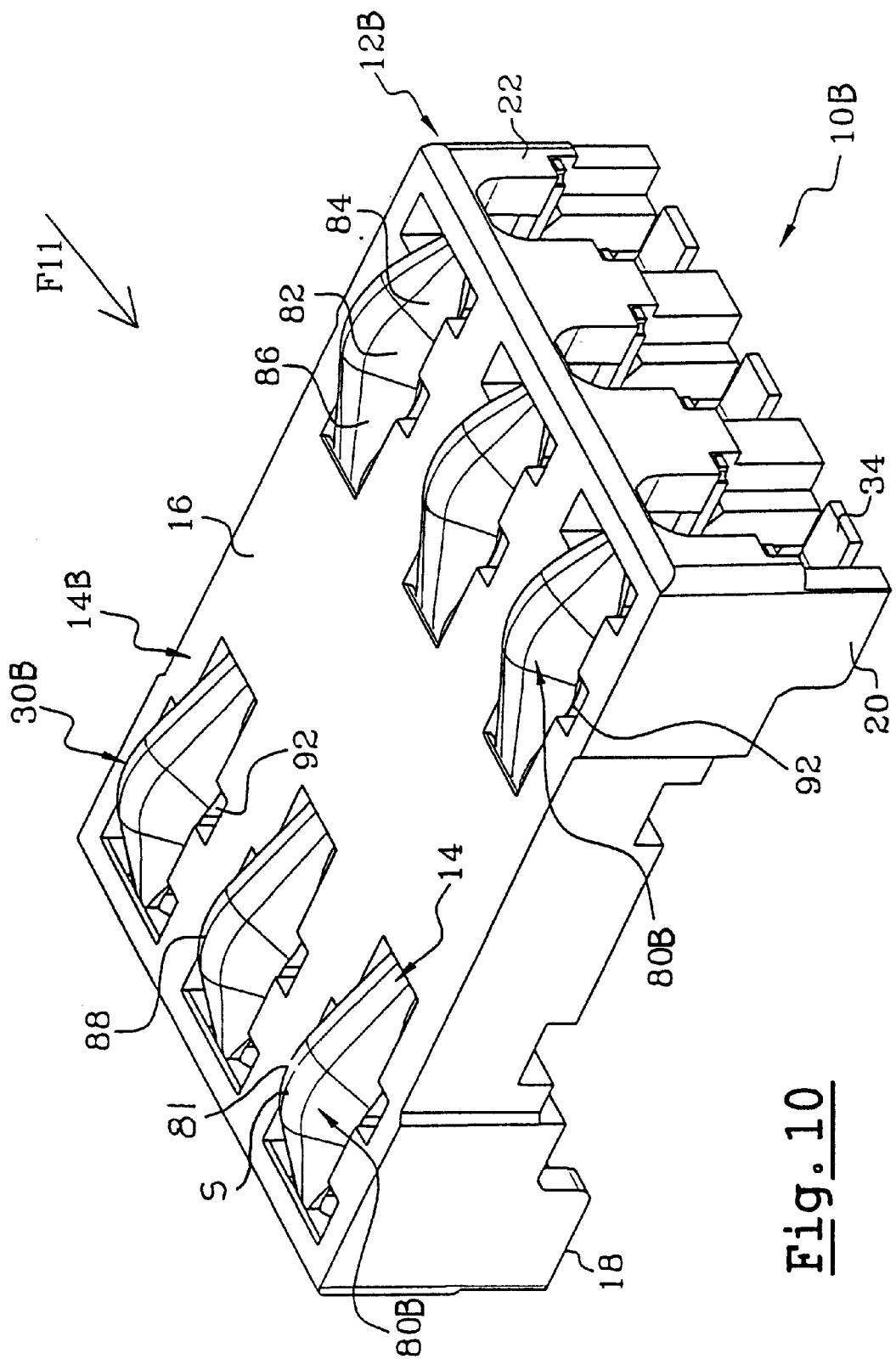
FIG. 10 is an isometric top view of the connector of the present invention, wherein the connector has three pairs of contacts.
Figure 11:
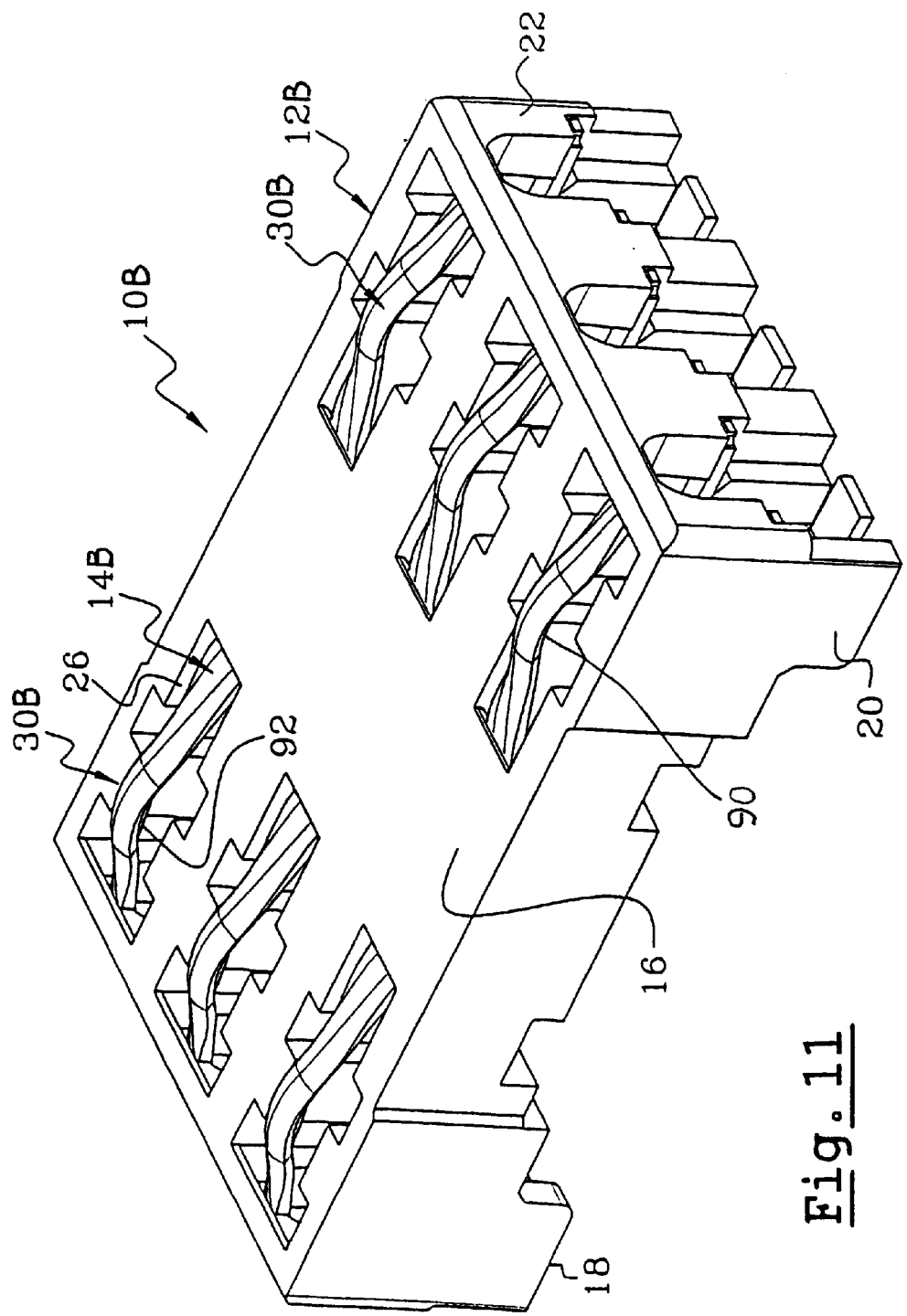
FIG. 11 is an isometric top view of the connector of FIG. 10, taken along arrow F11 of FIG. 10.

In accordance with the present invention, applicant constructs the contacts to allow sideward or lateral L insertion of a smart card while assuring that the contacts will be depressed by the side edge of the card instead of being damaged by it. Applicant's FIG. 10 shows a connector 10B with a body 12B and with contacts 14B of a new design that is shown in FIGS. 10–22. The contact has a projecting portion 30B with a top or upper part at S that is convexly curved about two horizontal axes and the contact has first and second opposite sides 80B, 81 extending downwardly and laterally from the top S. Each contact has a top line portion 88, flat first side portion 82 and curved first side portions 84, 86.

As shown in FIG. 20A, the first side 80B of the projecting portion extends at an angle A to the horizontal, of about 45°, with its lower end 92 lying no higher than the upper face 16 of the body 12B. That is, in the undeflected contact position, the lower end should lie no higher above the upper face 16 than 10% of the projection height H, and preferably no higher than a position even with the upper face 16. As a result, a lower corner 102 of a leading side edge 100 of a smart card C can be inserted in a lateral direction, and it will slide along the first side 80B while depressing it to a level where the top part S is only slightly above the upper surface of the body. It is noted that a housing or case 94 on which the connector is mounted, has a cover 95 that holds down the card against the upper biasing force of the contacts. The card can move up against the cover, so that the top part S of each contact lies above the upper face 16 by the amount that the card moves up until it contacts the cover.

The contact has a centerplane AL that is normal to the lateral direction L. Most of the contact is symmetrical about that centerplane. That is, each contact such as shown in FIG. 19, has its mounting portion 46B, lower branch 40B, center loop 44B, upper branch 42B, and nose 32 symmetric about the centerplane. However, the projecting portion 30B is not symmetric about the centerplane AL. Instead, FIG. 20A shows that the top part S lies on the second side of the centerplane. This results in a longer first side 80B, so the first side can extend at a smaller angle A to the horizontal within the given width of the contact.

In FIG. 20A, the first side 80B extends at an angle A of about 45° to the horizontal. If the angle A exceeded about 70°, then there would be a danger that the card leading edge corner 102 would damage the contact instead of depressing it. If the angle A were made smaller, than depressing of the contact would be assured with a lower insertion force, but the projecting portion of the contact would either have to be wider or not as tall. As a practical matter, if the angle is less than an angle B of about 20°, then the projecting portion of the contact will have to project a small distance above upper face 16 or will have to be very wide, in order than the lower edge 92 of the first side lie at or below the level of the upper face 16. As shown in FIG. 10, the first side 80B is generally in the form of a planar surface that extends at an incline of about 45° to the horizontal and to the vertical. The second side 81 (FIG. 20A) of each contact extends only a short distance in the second direction D2 away from the top part S, while the first side 80B extends a long distance in the first direction D1 from the top part S.

The nonsymmetrical shape of the projecting portion results in the need for two type of contacts. FIGS. 19 and 20 show that the two types of contacts are mirror images of each other and are not identical. The width of each contact is about 1.2 mm and the offset of the top S from the centerplane AL is about 0.25 mm. FIG. 20A shows that the lower edge 92 of the second side of each contact projecting portion lies above the upper face 16 of the body.

Figure 12:
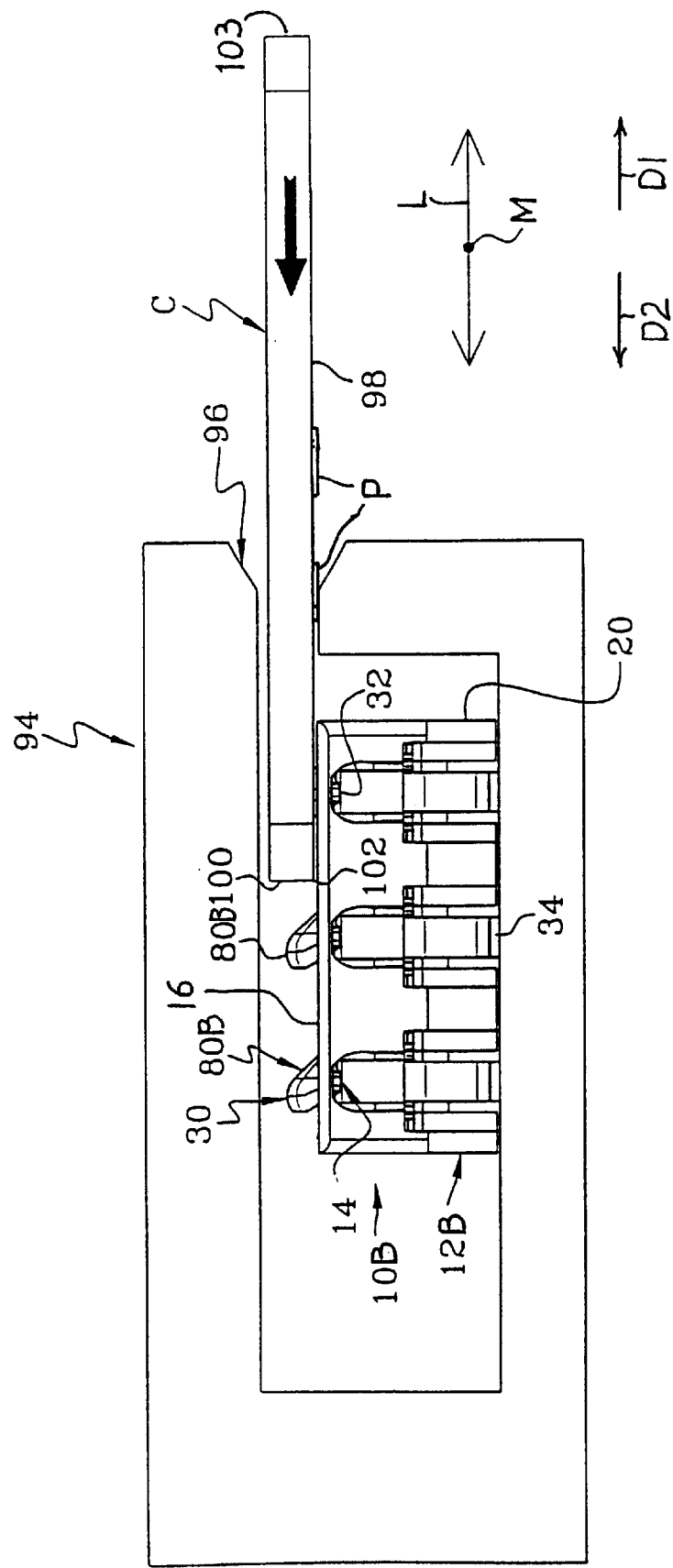
FIG. 12 is a simplified view of the connector of FIG. 10, shown in a case of a read-write device, and showing a smart card partially inserted into the case.
Figure 13:
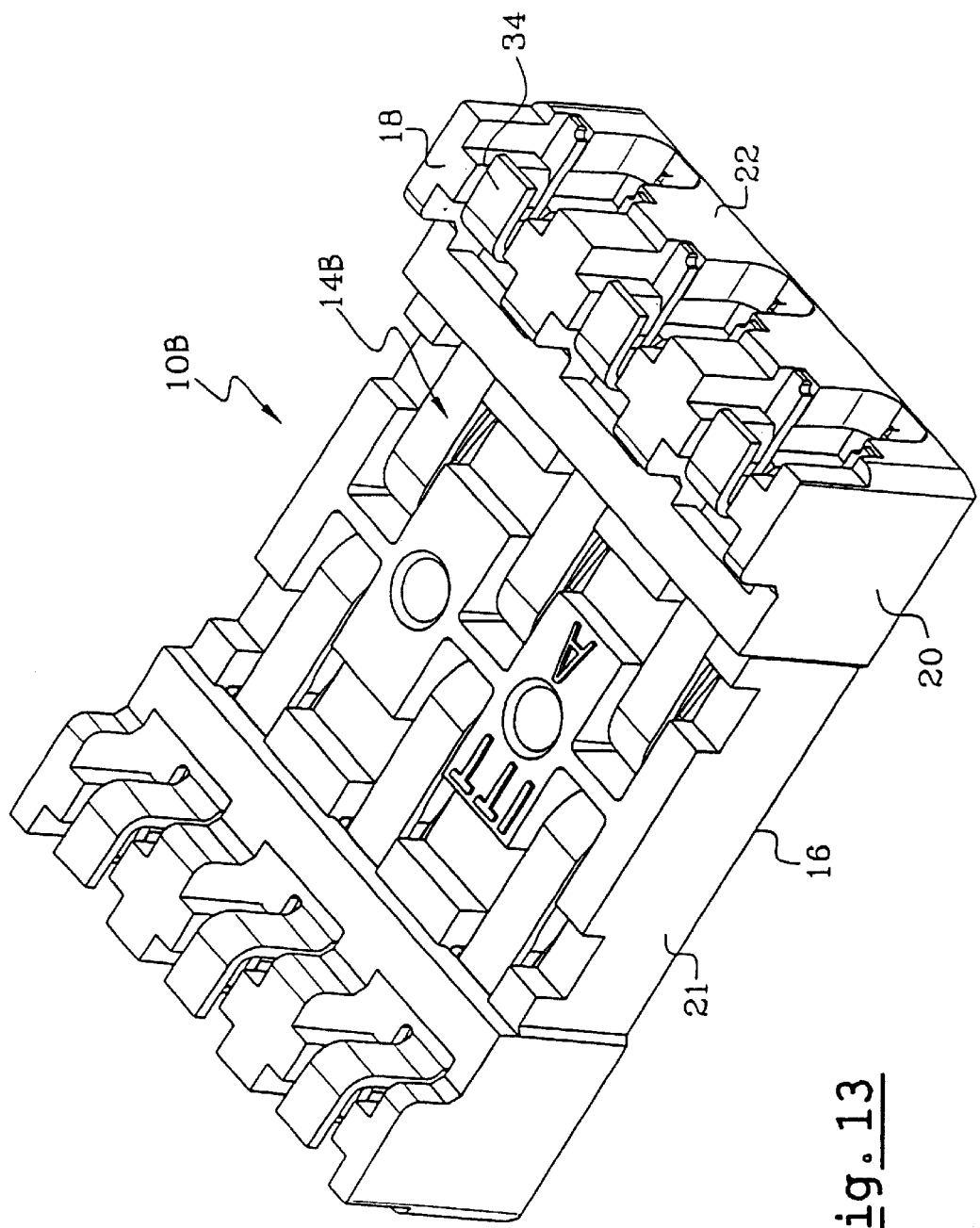
FIG. 13 is a bottom isometric view of the connector of FIG. 10.
Figure 17:
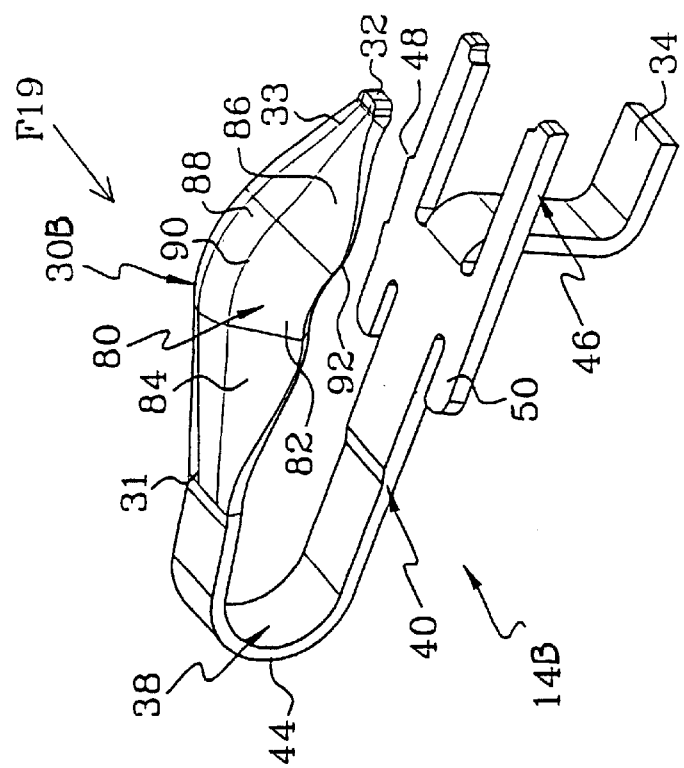
FIG. 17 is an isometric side view of a contact of a connector of FIGS. 10–16.
Figure 18:
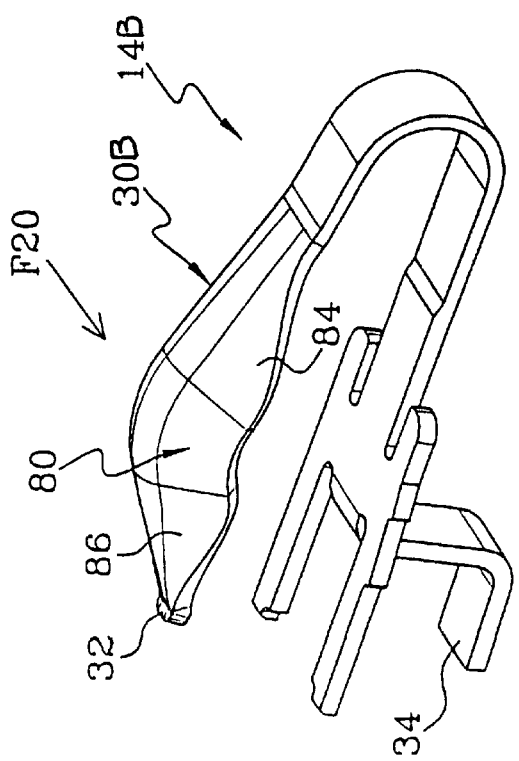
FIG. 18 is an isometric side view of another contact of the connector of FIGS. 10–16, with the contacts of FIGS. 17 and 18 being a pair of longitudinally-space contacts.
Figure 22:
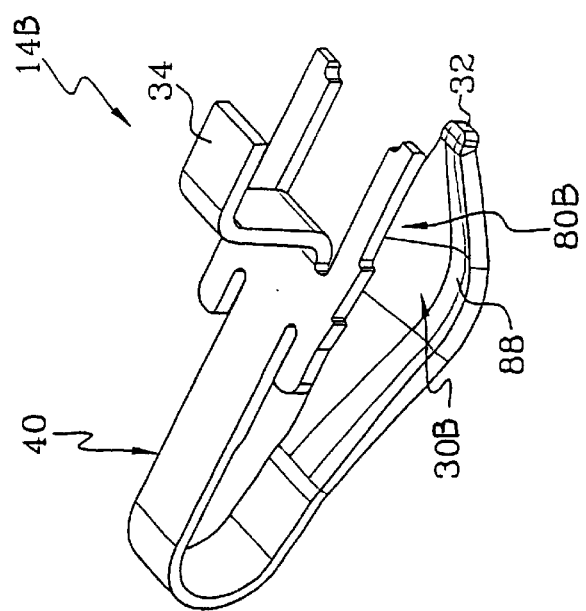
FIGS. 21 and 22 are isometric bottom views taken along arrows F21 and F22, respectively, of FIGS. 19 and 20.
Figure 21:
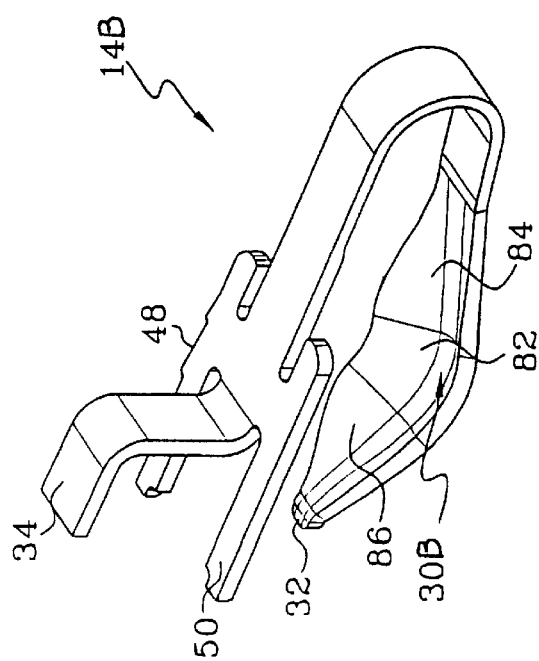
Figure 23:
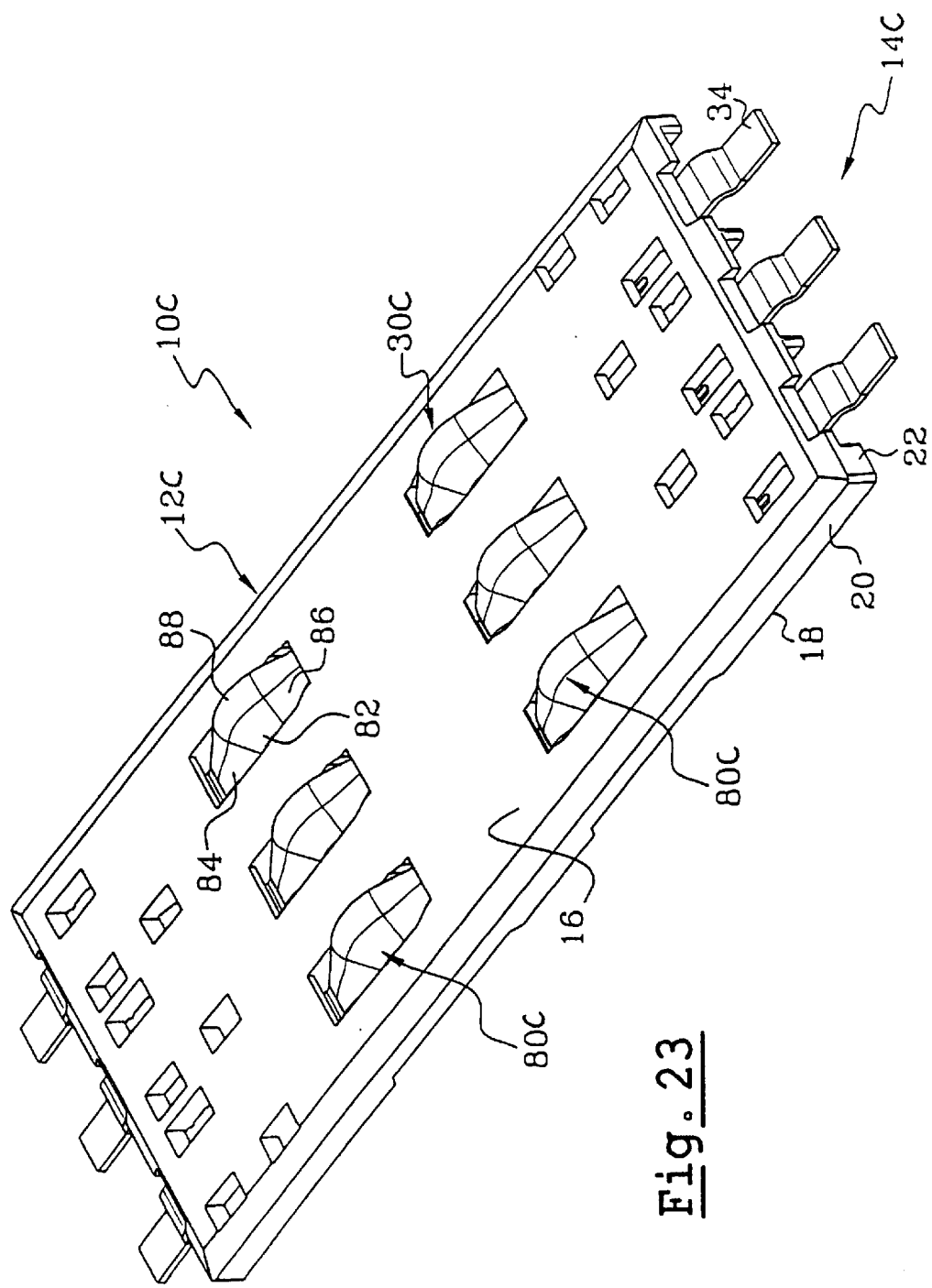
FIG. 23 is a top isometric view of a connector of another embodiment of the invention, wherein the connector is thin.
Figure 24:
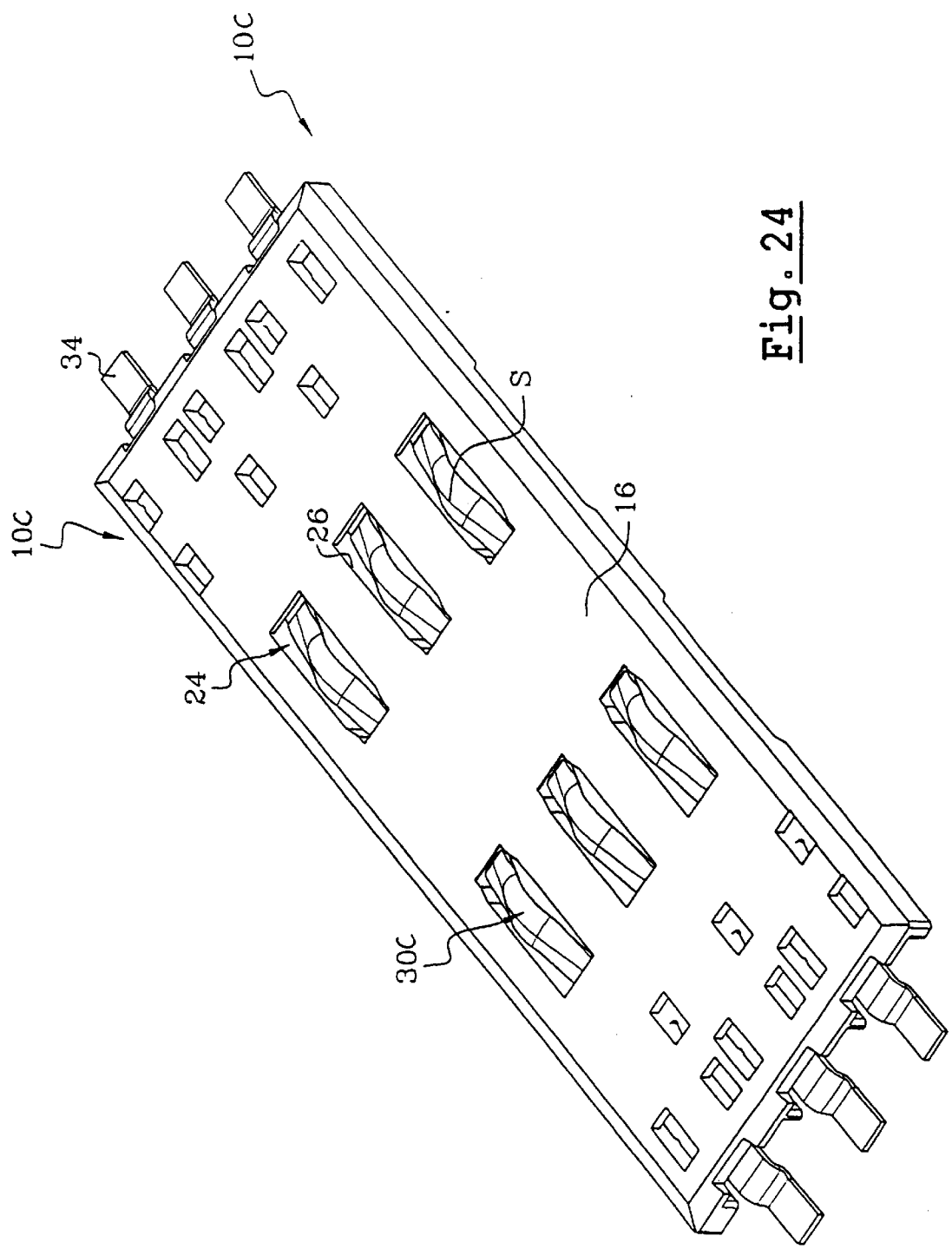
FIG. 24 is an opposite side isometric view of the connector of FIG. 23.
Figure 25:
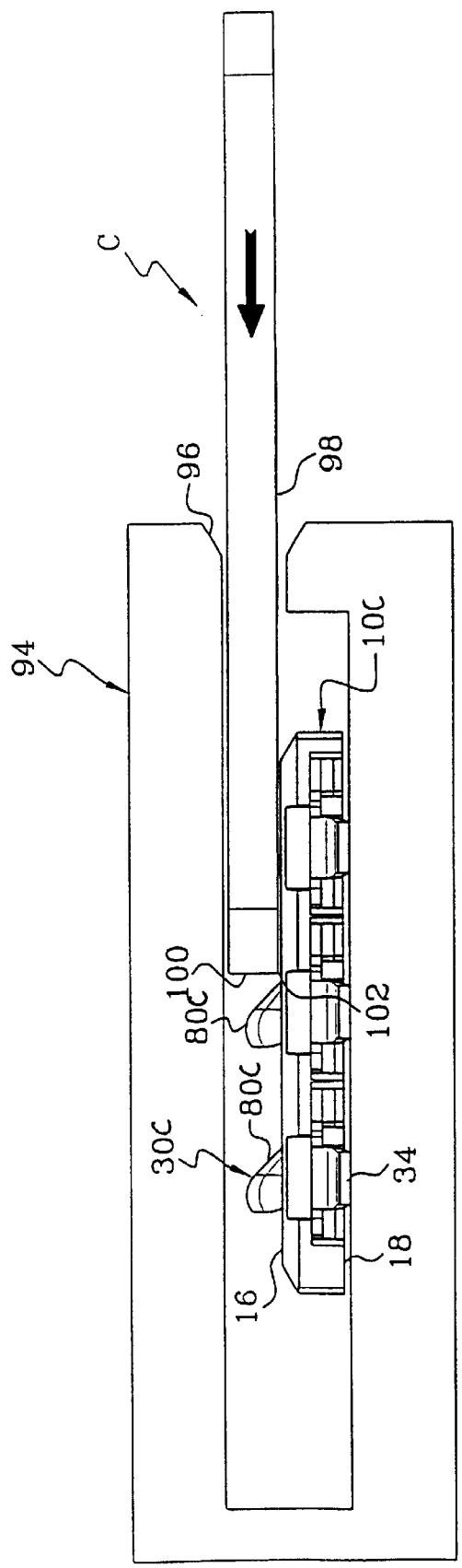
FIG. 25 is a simplified view of a casing with the connector of FIG. 23 mounted therein, and showing how a card can be inserted into the casing.
Figure 26:
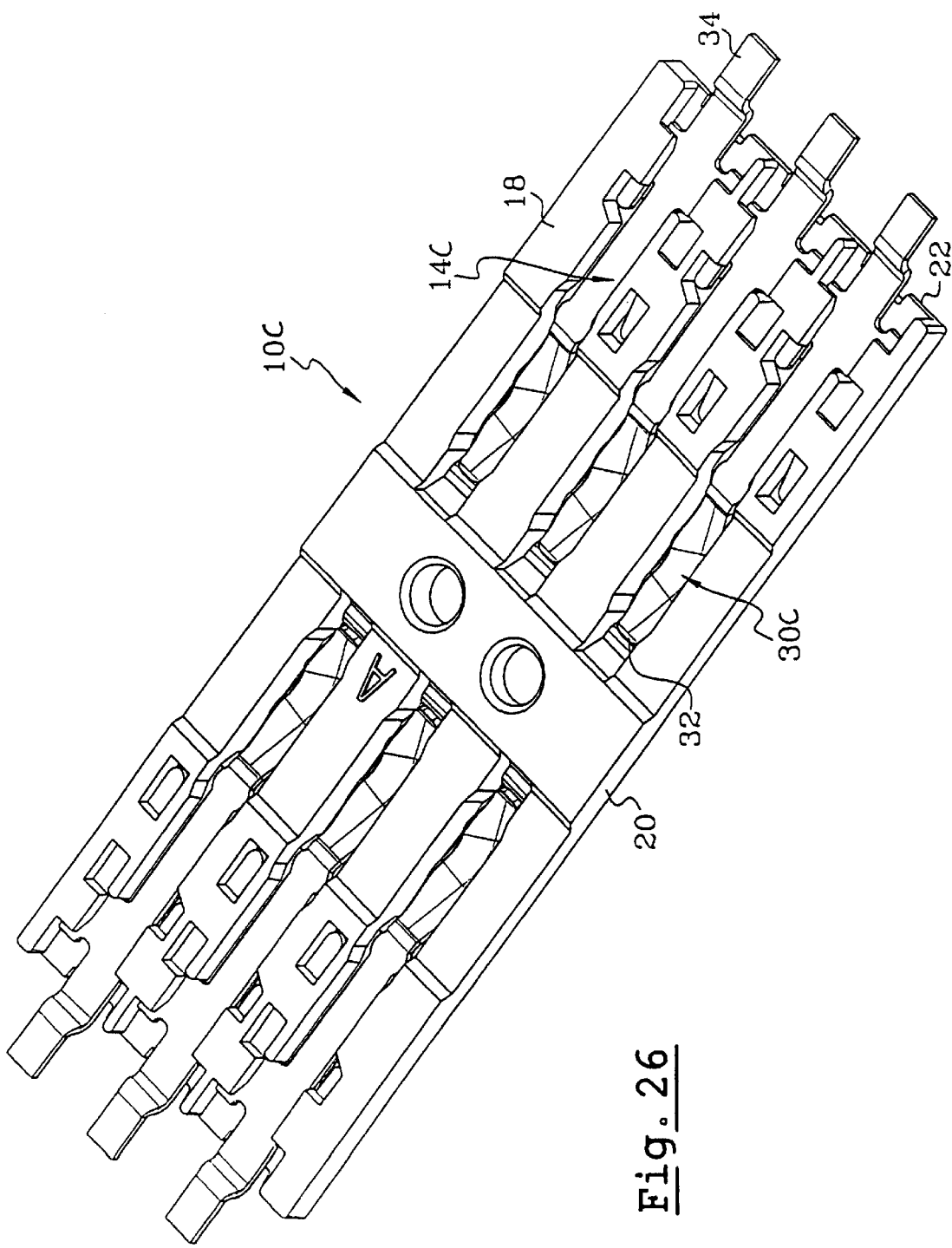
FIG. 26 is a bottom isometric view of the connector of FIG. 23.
Figure 41:
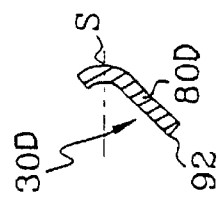
FIG. 41 is a sectional view on line 41—41 of FIG. 38.
Figure 40:
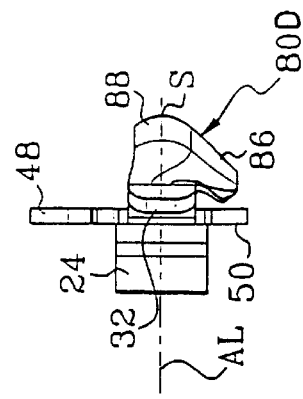
FIG. 40 is a view taken along line F40 of FIG. 38.
Figure 39:
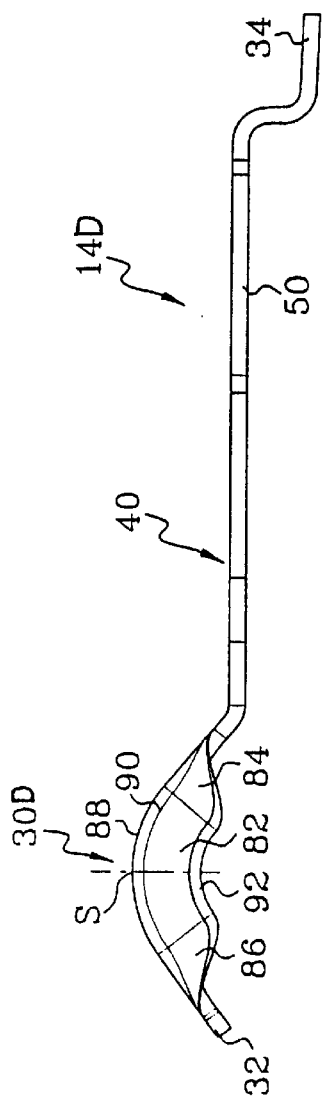
FIG. 39 is a side elevation view taken on line F39 of FIG. 38.

FIG. 12 shows the connector 10B mounted in a case to form a cover over the upper face of the connector body 12B. The case has a slot 96 that opens in a rightward or first lateral direction D1, so a smart card C can be inserted laterally L in a second direction D2 into the slot. The card depresses the projecting portions of the contacts and allows them to engage contact pads P on the lower face of the card. The angle of the first face 80B of each contact from the horizontal is about 45°, so the contacts are readily depressed. The design of the contacts allows the card to be inserted in three different directions into the slot 96. The directions are the second lateral direction D2, and each of two opposite longitudinal M directions. Only an insertion of the card in the first lateral direction D1 is not allowed. The ability to insert the card in a lateral direction can have advantages for the card which has a longer length in a longitudinal direction than its width in a lateral direction. The slot that receives the card can have a smaller depth.

FIGS. 23–33 show another connector 10C which is similar to that of FIGS. 10–22, but with the connector being of the thin type that does not have a 180° bend. The simple elongated contacts of the connector 10C are often called "cross" contacts because of the lack of a 180° bend. Each of the contacts 14C has a projecting portion 30C which is of the same shape as those of the connector of FIGS. 10–22. FIGS. 32 and 33 show the shape of the second side of the contacts 14C, while FIGS. 30 and 31 show the shape of the first side of each contact.

FIGS. 38–41 show another contact 14D wherein the projecting portion 30D of each contact is offset from the centerplane AL of the contact. It can be seen from FIG. 38 that the first side 80D of the projecting portion projects beyond the first side of the section 40D of the contact. Such projection to one side allows the first side 80D to project below the upper face of the body and have its top S extend a considerable distance above the body upper face, while the first side 80D extends at a moderate angle such as 45° to the horizontal.

Figure 38:
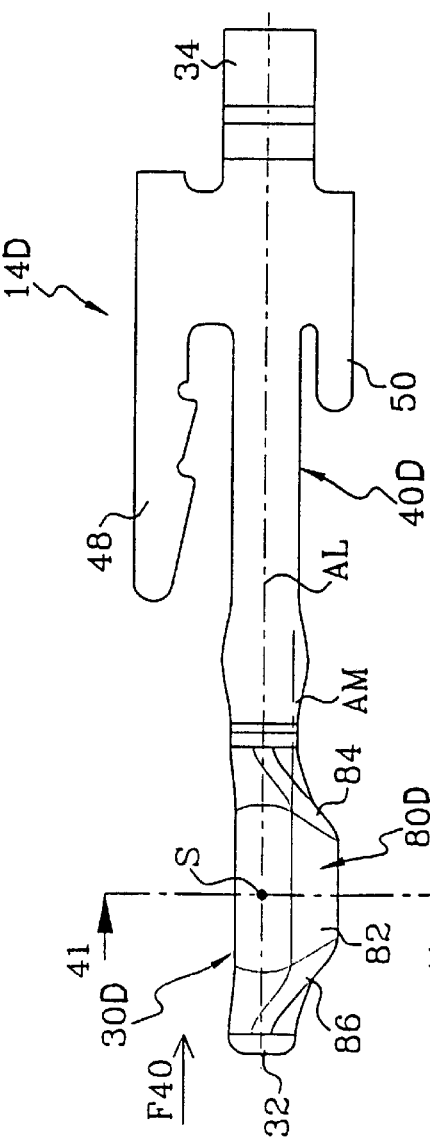
FIG. 38 is a plan view of a contact of still another embodiment of the invention.

One can compare FIG. 38 to FIG. 34, to see that the contact of FIG. 38 has its projecting portion first side 80D extending considerably to the first side while its opposite or second side does not extend beyond the width of the section 40C. This is different from the contact of FIG. 34 where the first and second sides both project slightly beyond the narrowest part of the contact.

Figure 42:
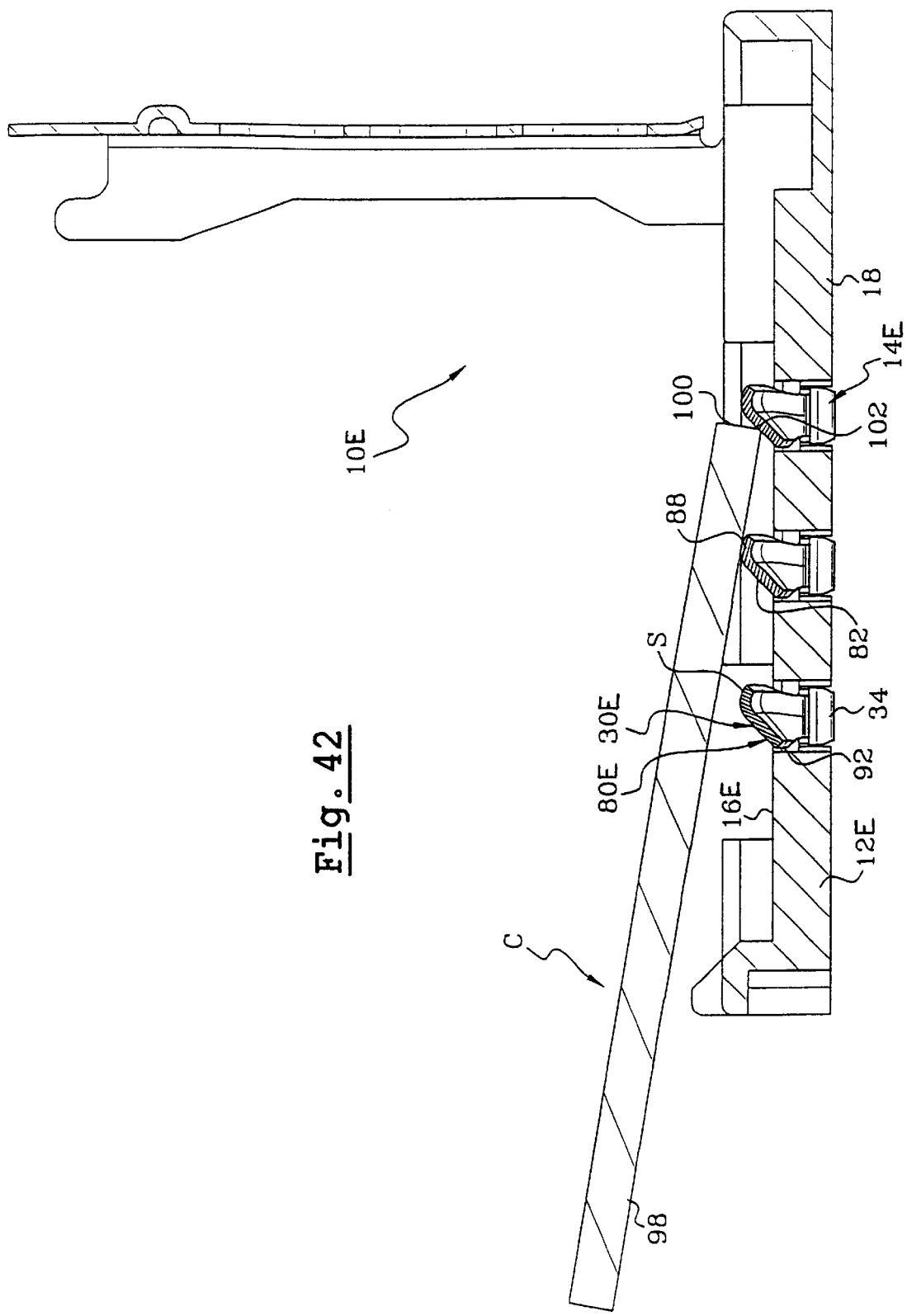
FIG. 42 shows a first step during the insertion of a card into a connector of still another embodiment of the invention.
Figure 43:
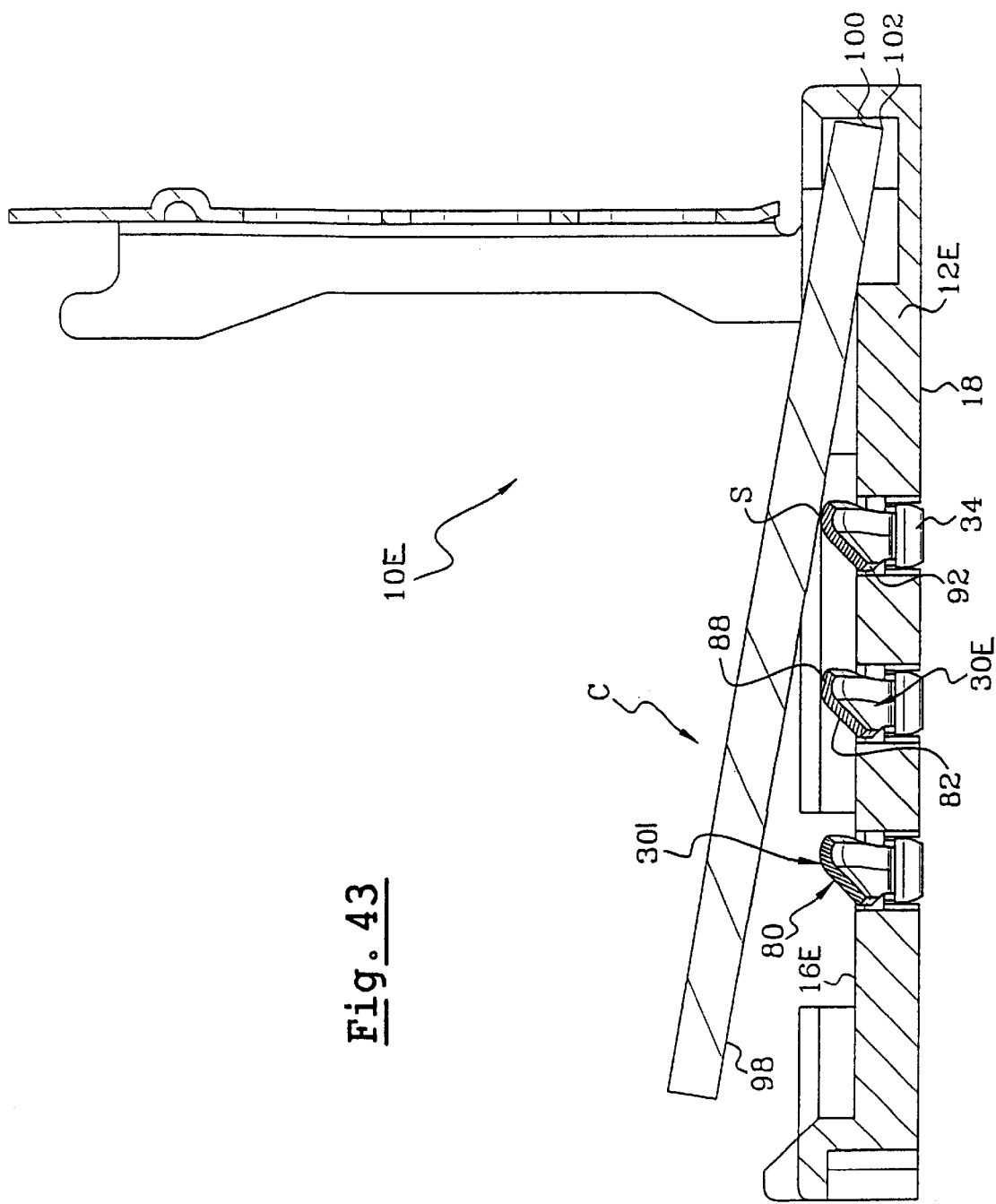
FIG. 43 shows a second step during the insertion of a card of FIG. 42.

FIGS. 42 and 43 show another way for insertion of a card into a case of a housing that includes the connector of the present invention. The card C is initially inserted as shown in FIG. 42, at an acute angle to the horizontal upper face 16E of the body 12E. Then, as shown in FIG. 43, the card is slid in a second direction D2. During such sliding, the lower corner 102 of the card side edge 100 may depress the contacts. Since the card extends at an angle to the upper face, the contacts will be easily depressed by the card.

Figure 44:
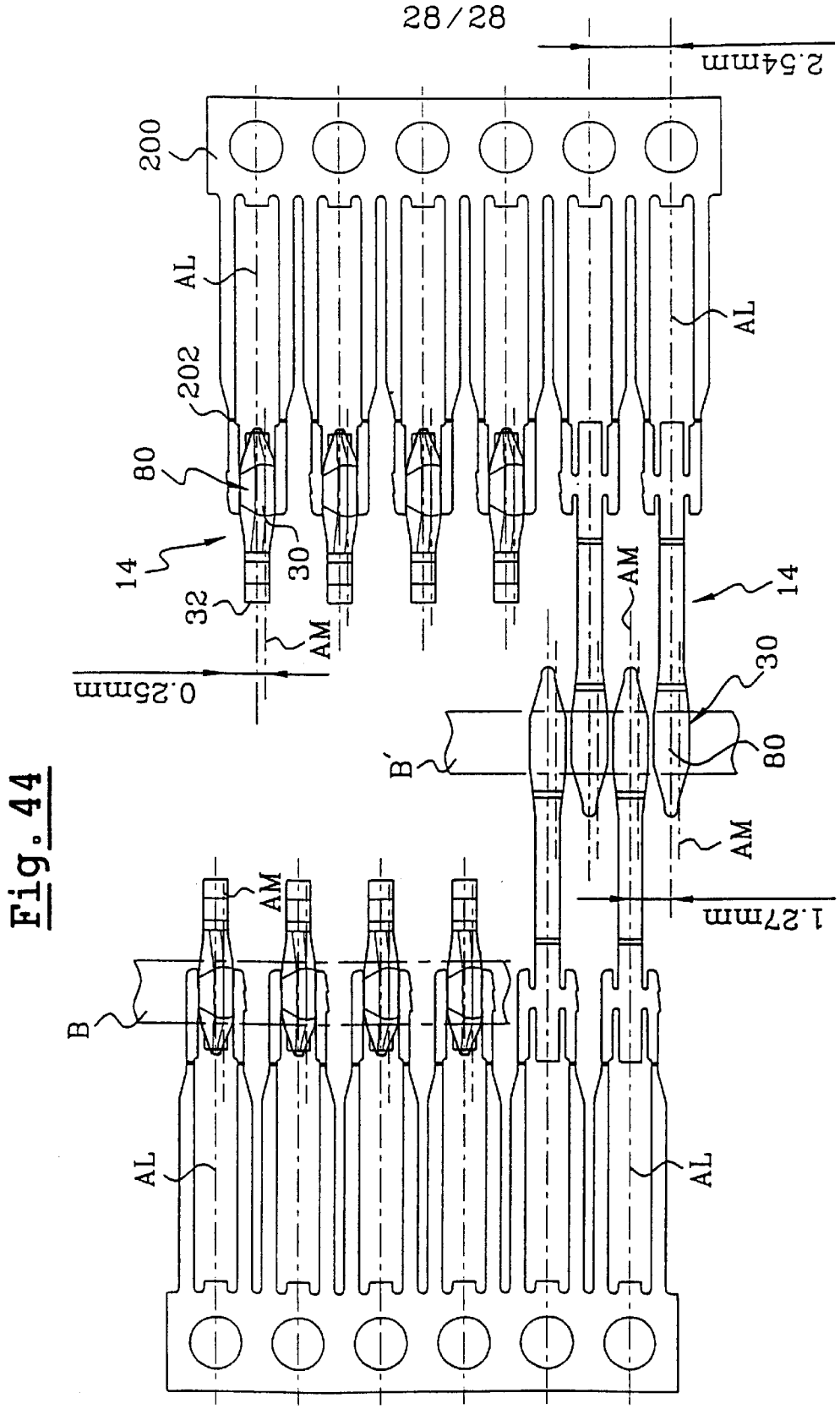
FIG. 44 is a schematic plan view indicating the process for blanking and forming into strips, contact blades of the invention.

FIG. 44 shows a portion of a piece of sheet metal which has been blanked to form contacts 14. The portions at 30 that are to form the projecting portions, can lie side-by-side to reduce the amount of metal that is used. Only the center band, at B' is gold plated. It is possible to have projecting portions 30 that are much wider, and to allow both first and second opposite sides of the projecting portions extend at a downward incline to below the upper face of the body. However, this requires greater spacing between contacts.

While terms such "horizontal" and "vertical" have been used to help describe the invention as it is illustrated, it should be understood that the connector can be used in any orientation with respect to Earth.

Thus, the invention provides a connector and a housing that holds the connector, which allows a smart card to be inserted with its side edge forming the leading edge, and generally which also allows the card to be inserted in a longitudinal direction. The connector includes an insulative body with a horizontal planar upper face and a plurality of contacts. The projecting portion of each contact has a curved top part and has a first side that extends at a moderate to small angle to the horizontal. The first side, which is engaged by the side edge of the laterally inserted card, extends at an incline of less than 70°0 and at least 20° to the horizontal upper surface of the body, and preferably between 60° and 30° to the horizontal upper surface. This angle occurs between a lower first side location that is at about the same height as the body upper surface, and along a majority of the height of the projecting portion. The incline of no more than 70° to the horizontal, and preferably no more than 60° to the horizontal, preferably continues along the entire height of the first side of the projecting portion, since the angle decreases to zero at the top of the projecting portion. Each of the projecting portions is preferably nonsymmetrical about the centerplane of the contact, to provide a greater width along which the first side extends at a downward and outward (away from the centerplane) incline. The connector is mounted on or is part of a housing that includes a cover that holds down the smart card and that forms a slot that is open at a first lateral side of the housing for insertion of the smart card in a second lateral direction into the slot.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for connecting to contact pads on a face of a smart card, which allows the smart card to be inserted in longitudinal or lateral direction, the longitudinal and the lateral direction being perpendicular to each other, which includes an insulative body having a horizontal upper face that lies in a horizontal plane, wherein the horizontal plane extends in lateral and longitudinal directions and is normal to a vertical direction, said connector including a plurality of contacts mounted on said body, each contact lying on a vertical centerplane that is normal to said lateral direction and each contact having first and second sides on laterally opposite sides of the centerplane, each contact having a width in said lateral direction and having a length in said longitudinal direction, said length being more than twice said width, and each contact having a projecting portion that projects above said body upper face when a smart card is not present, wherein:

the projecting portion of each contact has a curved top part for engaging one of said contact pads, and each projecting portion has a lateral first side that extends at a downward and outward incline laterally away from said centerplane, at an angle to the horizontal that is at least 20° and no more than 70°, down to at least about said horizontal plane of said body upper face.

2. The connector described in claim 1 wherein:

said first side of each contact projecting portion extends at an angle to the horizontal of no more than 60°.

3. The connector described in claim 1 wherein:

said first side of each of said contacts extends at said incline of at least 20° to the horizontal, along a majority of the height by which said pad-engaging portion projects above said upper face.

4. The connector described in claim 1 wherein:

the projecting portion of each of said contacts is nonsymmetrical about said vertical centerplane of the contact, and each projecting portion has a second side which is opposite said first side, with said second side having a smaller vertical height then said first side.

5. The connector described in claim 1 wherein:

said curved top part has a highest point that is laterally offset from said centerplane to lie on said second side of said centerplane that is opposite said first side, whereby to allow for a wider first side.

6. The connector described in claim 1 wherein:

the vertical centerplane of each contact extends in vertical and longitudinal directions that are each perpendicular to said lateral direction; and including a housing which includes said body and a case with a slot that is open in a first lateral direction, to allow the sideward insertion of a smart card in a primarily second lateral direction toward said first sides of said contacts.

7. An electrical connector for connecting to contact pads on a face of a smart card which allows the smart card to be inserted in longitudinal or lateral direction, the longitudinal and the lateral direction being perpendicular to each other, that has longitudinally spaced front and rear ends and laterally spaced opposite side edges, where the connector includes a housing with an insulative body having a horizontal upper face and with a cover part that lies over said upper face to form a card-receiving slot between them, wherein said connector includes a plurality of contacts that each includes a branch having a width in the lateral direction and having first and second laterally opposite branch sides, said branch having a length in the longitudinal direction, the length of the branch being greater than its width, and each of said branches has a projecting portion that projects above said upper face when a smart card is not present and that can be resiliently depressed, wherein:

said smart card-receiving slot is open in a first lateral direction which is perpendicular to said longitudinal directions, to allow insertion of the smart card in a second lateral direction that is opposite said first lateral direction;

the projecting portion of each of said contacts has a top and has a first side that is inclined at least about 20° from the horizontal to extend downward and in said first lateral direction to at least about the height of said housing upper face, to enable one of said side edges of the smart card to engage said first side of said projecting portion to depress said projecting portion.

8. The connector described in claim 7 wherein:

said plurality of contacts are arranged in a plurality of columns and rows, wherein each column consists of two contacts that are longitudinally spaced apart and that are of about the same shape and oriented so one is turned 180° about a vertical axis from the other, and both have a first side inclined about 45° from the horizontal to extend downward and in said first lateral direction.

9. The connector described in claim 7 wherein:

said contacts each have a centerplane, with a majority of the length of each contact being strip-shaped and with the centerplane lying halfway between opposite sides of the strip shape, but with said projection being nonsymmetric about said centerplane in that a top of each contact projecting portion lies on a second side of the centerplane that is opposite said first side of said projecting portion.

10. An electrical connector for connecting to contact pads on a face of a smart card, which allows the smart card to be inserted in longitudinal or lateral direction, the longitudinal and the lateral direction being perpendicular to each other, wherein the connector includes a housing having an insulative body with a horizontal upper face and a cover lying over said upper face to hold down a smart card, and a plurality of contacts mounted on said body with each contact being in the form of a strip of sheet metal including a section which has an average width in a lateral direction and a length in a longitudinal direction, said length being greater than said width, said section being curved about a lateral axis and a portion of said section projecting above said body upper face when a smart card is not present, with said contacts arranged in two laterally extending rows and with one contact in each row being longitudinally spaced from a contact in the other row, wherein:

each of said contacts has a top part for engaging one of said contact pads, and each contact has a first lateral side facing upwardly and in a first lateral direction to be depressed by a smart card side edge that moves primarily in a second lateral direction that is opposite said first lateral direction, across said first sides of said contacts, with said cover permitting such movement of a smart card side edge primarily in said second direction;

said first sides of said contacts each has a card-edge engaging surface for engaging a card-edge moving in said second lateral direction, that extends at an angle of at least 20° to the vertical and that has a lower end lying substantially no higher than said housing upper face when a card is not present.

11. The connector description in claim 10 wherein:

each of said contacts first side card-edge engaging surfaces extends at an angle of at least 30° to the vertical along a majority of the height of said projecting portion, down to the level of said upper face.

12. The connector described in claim 10 wherein:

each of said contacts has a vertical centerplane which is normal to said lateral direction, and said top part of each contact is offset from said centerplane to lie on a side of said centerplane that is opposite said first side.

13. A contact for use in an electrical connector that receives a smart card, comprising:

a strip of sheet metal that has laterally-spaced opposite sides and that has a section that has an average width in a lateral direction, that has a length in a longitudinal direction which is greater than said average width, and that has a vertical centerplane that is normal to said lateral direction, said section forming a curved projecting portion that is curved about lateral axes to form a curved top for engaging the card, and said curved projecting portion having first and second laterally opposite sides lying on laterally opposite sides of said top part, said first side extending downward and away from said vertical centerplane at an angle of about 45° to the vertical whereby to allow insertion of a smart card in a longitudinal or lateral direction.

14. The contact described in claim 13 wherein:

said upper section is nonsymmetrical about said centerplane, in that said first side has a greater width in said lateral direction than said second side.

\* \* \* \* \*